United States Patent
Yasugi et al.

(10) Patent No.: US 9,794,584 B2
(45) Date of Patent: Oct. 17, 2017

(54) IMAGE DECODING APPARATUS, IMAGE DECODING METHOD, IMAGE CODING APPARATUS, AND IMAGE CODING METHOD

(71) Applicant: Sharp Kabushiki Kaisha, Sakai, Osaka (JP)

(72) Inventors: Yukinobu Yasugi, Sakai (JP); Tomoyuki Yamamoto, Sakai (JP); Tomohiro Ikai, Sakai (JP); Takeshi Tsukuba, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/426,251

(22) Filed: Feb. 7, 2017

(65) Prior Publication Data

US 2017/0150164 A1 May 25, 2017

Related U.S. Application Data

(63) Continuation of application No. 15/040,091, filed on Feb. 10, 2016, now Pat. No. 9,615,092, which is a continuation of application No. 14/372,783, filed as application No. PCT/JP2013/051460 on Jan. 24, 2013, now Pat. No. 9,300,964.

(51) Int. Cl.
| | |
|---|---|
| *G06K 9/36* | (2006.01) |
| *H04N 19/50* | (2014.01) |
| *H04N 19/105* | (2014.01) |
| *H04N 19/159* | (2014.01) |
| *H04N 19/186* | (2014.01) |
| *H04N 19/182* | (2014.01) |

(52) U.S. Cl.
CPC ........... *H04N 19/50* (2014.11); *H04N 19/105* (2014.11); *H04N 19/159* (2014.11); *H04N 19/182* (2014.11); *H04N 19/186* (2014.11)

(58) Field of Classification Search
CPC .. H04N 19/103; H04N 19/159; H04N 19/186; H04N 19/176; H04N 19/105; H04N 19/11; H04N 19/436; H04N 19/467; H04N 19/593; H04N 19/70
USPC ......................................... 382/166, 232–233
See application file for complete search history.

(56) References Cited

U.S. PATENT DOCUMENTS

| | | | | |
|---|---|---|---|---|
| 8,861,594 B2 * | 10/2014 | Kim | ..................... | H04N 19/107 375/240.02 |
| 2013/0058411 A1 * | 3/2013 | Xu | ....................... | H04N 19/105 375/240.12 |
| 2013/0114696 A1 * | 5/2013 | Liu | ...................... | H04N 19/176 375/240.03 |

(Continued)

OTHER PUBLICATIONS

Yasugi et al., "Image Decoding Apparatus and Image Coding Apparatus", U.S. Appl. No. 15/040,091, filed Feb. 10, 2016.

*Primary Examiner* — Kanjibhai Patel
(74) *Attorney, Agent, or Firm* — Keating & Bennett, LLP

(57) ABSTRACT

In a case that a pixel shape in a luma domain is not similar to a pixel shape in a chroma domain in an input image, a prediction image that is generated in the reuse of a luma prediction mode is made more accurate.
A moving image decoding apparatus 1 includes a gradient deriving unit 1453B that references a chroma gradient definition DEFANG1C, and derives a chroma prediction direction from a prediction mode based on a luma prediction direction.

8 Claims, 30 Drawing Sheets

(56) References Cited

U.S. PATENT DOCUMENTS

2014/0010295 A1\* 1/2014 Lu .................... H04N 19/00569
375/240.12

\* cited by examiner

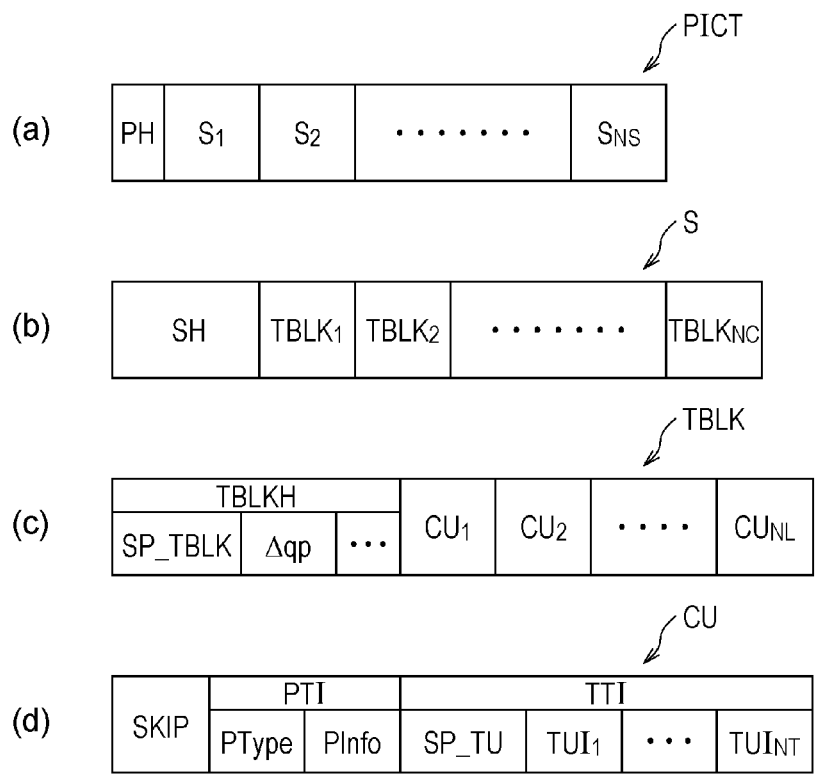

FIG. 6

DEFPM1

| NAME | IntraPredMode |
|------|---------------|
| Planar | 0 |
| HOR | 1 |
| VER | 2 |
| DC | 3 |
| VER-8 | 4 |
| HOR-6 | 5 |
| VER-6 | 6 |
| HOR-4 | 7 |
| VER-4 | 8 |
| HOR-2 | 9 |
| VER-2 | 10 |
| HOR+2 | 11 |
| VER+2 | 12 |
| HOR+4 | 13 |
| VER+4 | 14 |
| HOR+6 | 15 |
| VER+6 | 16 |
| HOR+8 | 17 |
| VER+8 | 18 |

| NAME | IntraPredMode |
|------|---------------|
| HOR-7 | 19 |
| VER-7 | 20 |
| HOR-5 | 21 |
| VER-5 | 22 |
| HOR-3 | 23 |
| VER-3 | 24 |
| HOR-1 | 25 |
| VER-1 | 26 |
| HOR+1 | 27 |
| VER+1 | 28 |
| HOR+3 | 29 |
| VER+3 | 30 |
| HOR+5 | 31 |
| VER+5 | 32 |
| HOR+7 | 33 |
| VER+7 | 34 |
| LM | 35 |

FIG. 8
(A) YUV4:2:0, 8×8CU, PartType=N×N
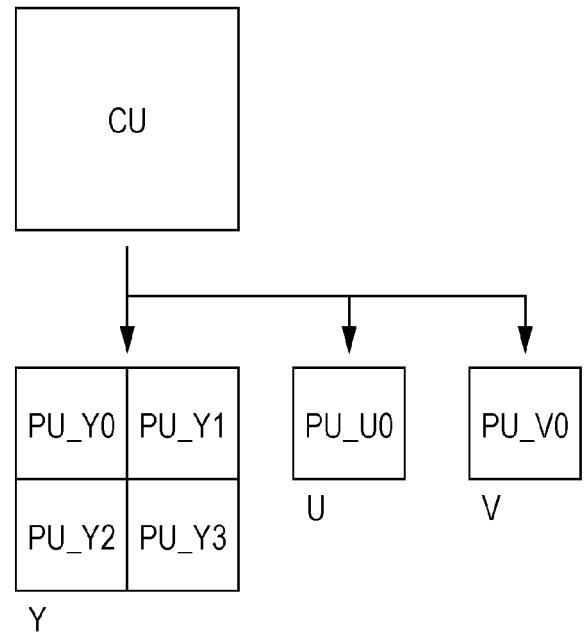
(B) YUV4:2:0, 16×16CU, PartType=2N×2N
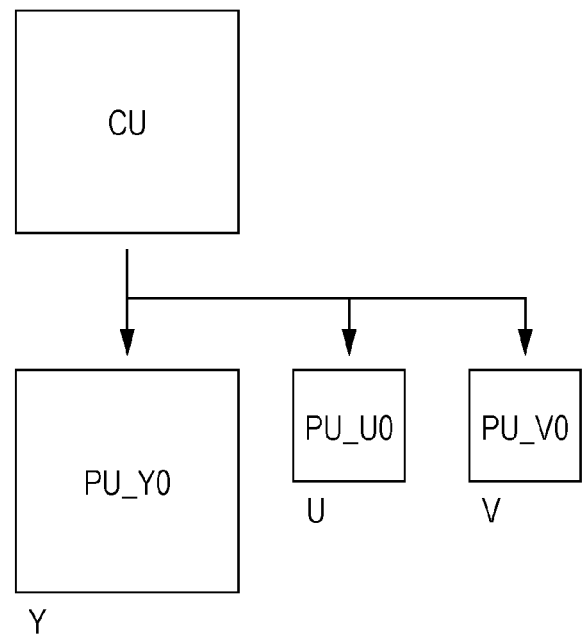

FIG. 9
(A) YUV4 : 2 : 2, 8×8CU, PartType=N×N
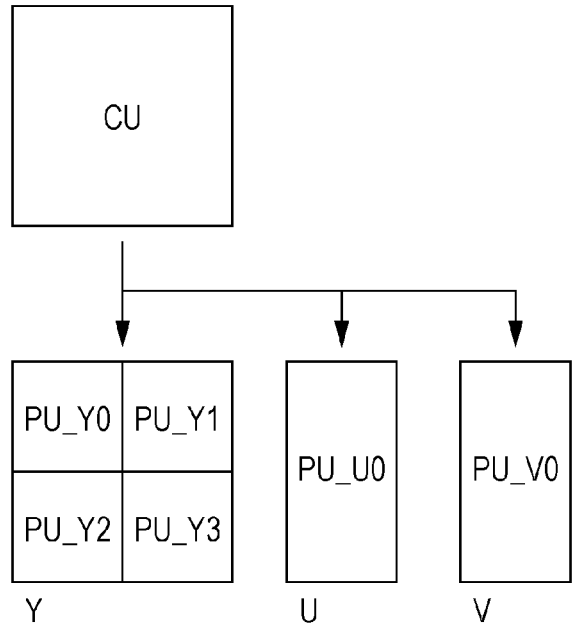
(B) YUV4 : 2 : 2, 16×16CU, PartType=2N×2N
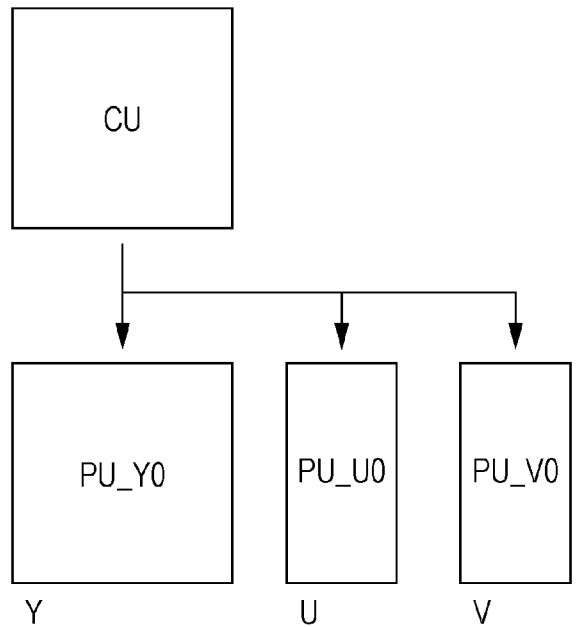

FIG. 10
(A) YUV4 : 2 : 2, 8×8CU, PartType=N×N
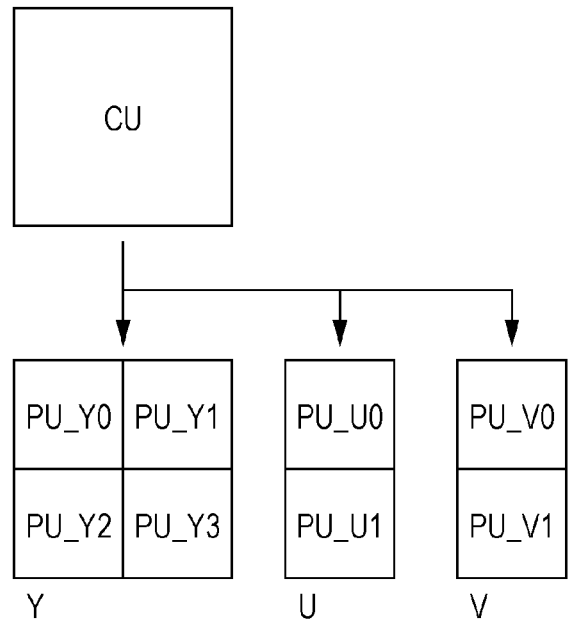
(B) YUV4 : 2 : 2, 16×16CU, PartType=2N×2N
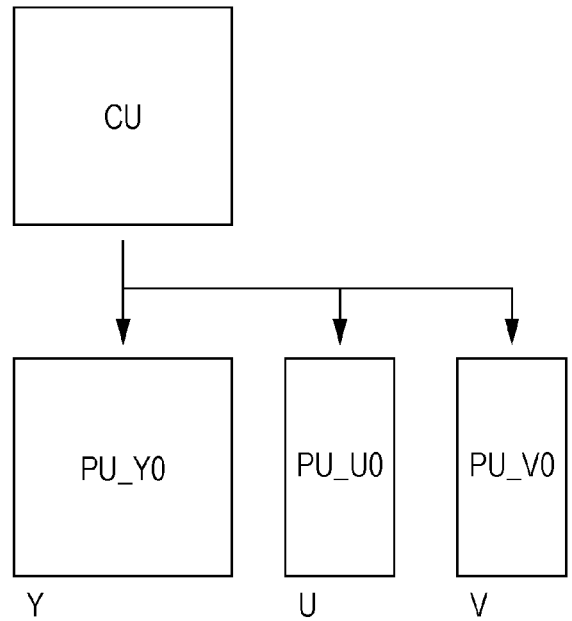

FIG. 13

DEFANG1

| IntraPredMode | HOR | HOR+1 | HOR+2 | HOR+3 | HOR+4 | HOR+5 | HOR+6 | HOR+7 | HOR+8 |
|---|---|---|---|---|---|---|---|---|---|
| IntraPredAngle | 0 | 2 | 5 | 9 | 13 | 17 | 21 | 26 | 32 |

| IntraPredMode | VER | VER+1 | VER+2 | VER+3 | VER+4 | VER+5 | VER+6 | VER+7 | VER+8 |
|---|---|---|---|---|---|---|---|---|---|
| IntraPredAngle | 0 | 2 | 5 | 9 | 13 | 17 | 21 | 26 | 32 |

| IntraPredMode | | HOR-1 | HOR-2 | HOR-3 | HOR-4 | HOR-5 | HOR-6 | HOR-7 | HOR-8 |
|---|---|---|---|---|---|---|---|---|---|
| IntraPredAngle | | -2 | -5 | -9 | -13 | -17 | -21 | -26 | -32 |

| IntraPredMode | VER-1 | VER-2 | VER-3 | VER-4 | VER-5 | VER-6 | VER-7 | VER-8 |
|---|---|---|---|---|---|---|---|
| IntraPredAngle | -2 | -5 | -9 | -13 | -17 | -21 | -26 | -32 |

FIG. 16

DEFANG1C

| IntraPredMode | HOR | HOR+1 | HOR+2 | HOR+3 | HOR+4 | HOR+5 | HOR+6 | HOR+7 | HOR+8 |
|---|---|---|---|---|---|---|---|---|---|
| IntraPredAngle | 0 | 1 | 2 | 4 | 6 | 8 | 10 | 13 | 16 |

| IntraPredMode | VER | VER+1 | VER+2 | VER+3 | VER+4 | VER+5 | VER+6 | VER+7 | VER+8 |
|---|---|---|---|---|---|---|---|---|---|
| IntraPredAngle | 0 | 4 | 10 | 18 | 26 | 34 | 42 | 52 | 64 |

| IntraPredMode | | HOR-1 | HOR-2 | HOR-3 | HOR-4 | HOR-5 | HOR-6 | HOR-7 | HOR-8 |
|---|---|---|---|---|---|---|---|---|---|
| IntraPredAngle | | -1 | -2 | -4 | -6 | -8 | -10 | -13 | -16 |

| IntraPredMode | | VER-1 | VER-2 | VER-3 | VER-4 | VER-5 | VER-6 | VER-7 | VER-8 |
|---|---|---|---|---|---|---|---|---|---|
| IntraPredAngle | | -4 | -10 | -18 | -26 | -34 | -42 | -52 | -64 |

DEFPMC1

| Chroma_mode | intraPredMode [ xB ] [ yB ] | | | | |
|---|---|---|---|---|---|
| | 0 | 1 | 2 | 3 | X(0<=X<35) |
| 0 | 7 | 0 | 0 | 0 | 0 |
| 1 | 1 | 7 | 0 | 0 | 1 |
| 2 | 2 | 2 | 7 | 1 | 2 |
| 3 | 3 | 3 | 3 | 7 | 3 |
| 4 | LM | LM | LM | LM | LM |
| 5 | 0 | 1 | 2 | 3 | X |

FIG. 28

CNVPM1

| NAME (Luma) | NAME (Chroma) | NAME (Luma) | NAME (Chroma) |
|---|---|---|---|
| Planar | Planar | HOR-7 | HOR-6 |
| HOR | HOR | VER-7 | VER-3 |
| VER | VER | HOR-5 | HOR-8 |
| DC | DC | VER-5 | VER-2 |
| VER-8 | VER-5 | HOR-3 | HOR-5 |
| HOR-6 | HOR-7 | VER-3 | VER-1 |
| VER-6 | VER-3 | HOR-1 | HOR-2 |
| HOR-4 | HOR-7 | VER-1 | VER |
| VER-4 | VER-2 | HOR+1 | HOR+2 |
| HOR-2 | HOR-3 | VER+1 | VER |
| VER-2 | VER-1 | HOR+3 | HOR+5 |
| HOR+2 | HOR+3 | VER+3 | VER+1 |
| VER+2 | VER+1 | HOR+5 | HOR+8 |
| HOR+4 | HOR+7 | VER+5 | VER+2 |
| VER+4 | VER+2 | HOR+7 | VER+6 |
| HOR+6 | VER+7 | VER+7 | VER+3 |
| VER+6 | VER+3 | LM | LM |
| HOR+8 | VER+5 | | |
| VER+8 | VER+5 | | |

FIG. 30

| INTRA PREDICTION MODE (IntraPredMode) | INTRA PREDICTION METHOD |
|---|---|
| 0 | Intra_Planar |
| 1 | Intra_Vertical |
| 2 | Intra_Horizontal |
| 3 | Intra_DC |
| 35 | Intra_FromLuma (USED ONLY FOR CHROMA) |

FIG. 31
(a)
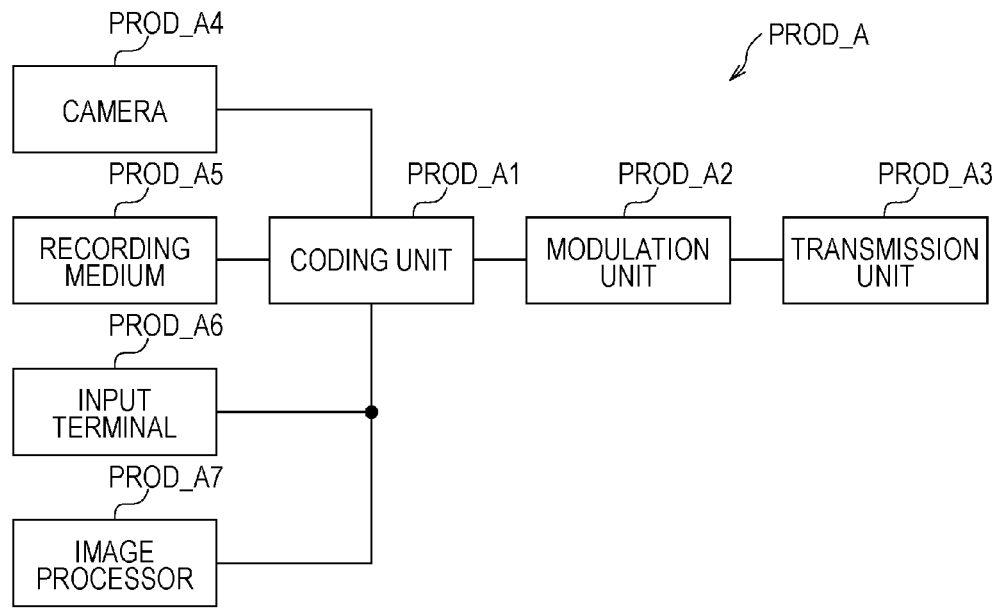
(b)
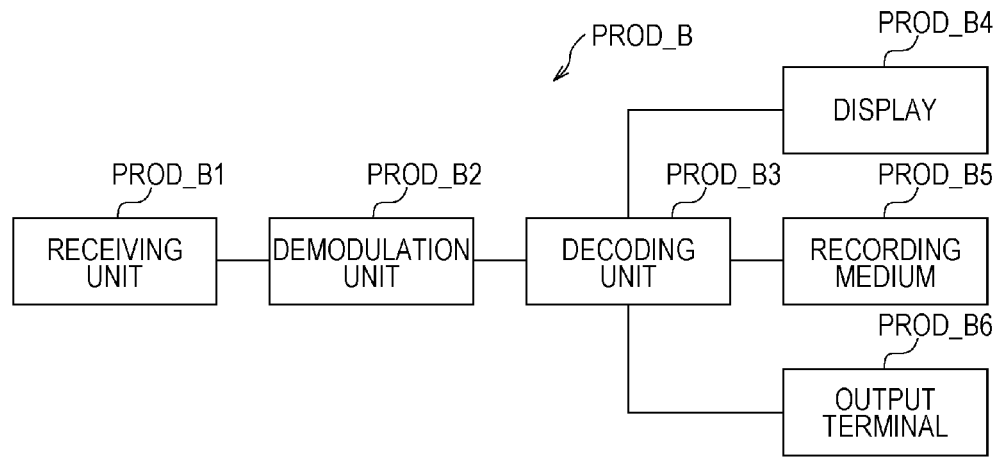

FIG. 32
(a)
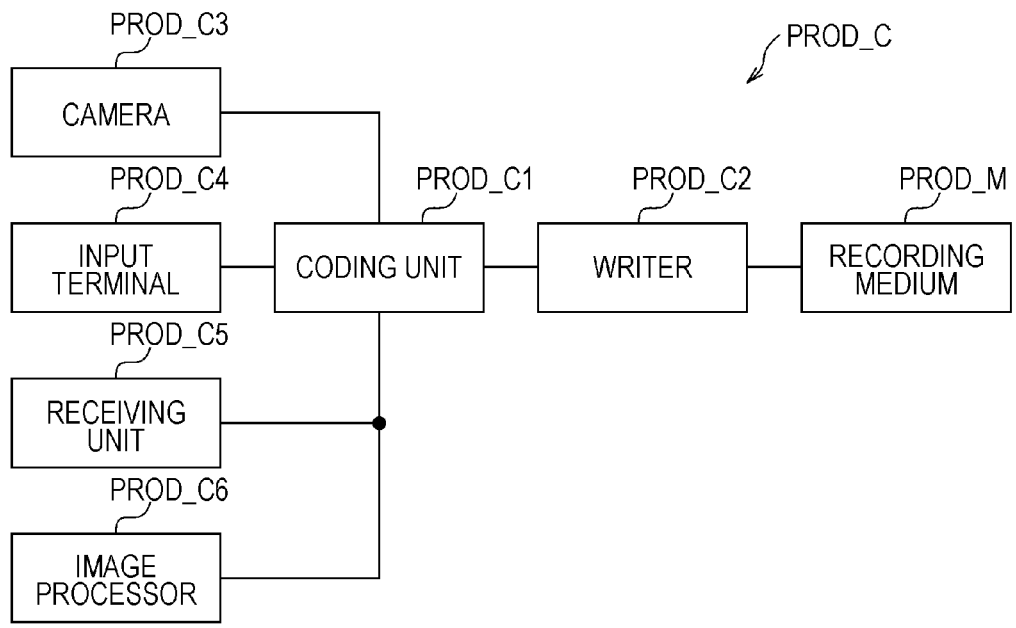
(b)
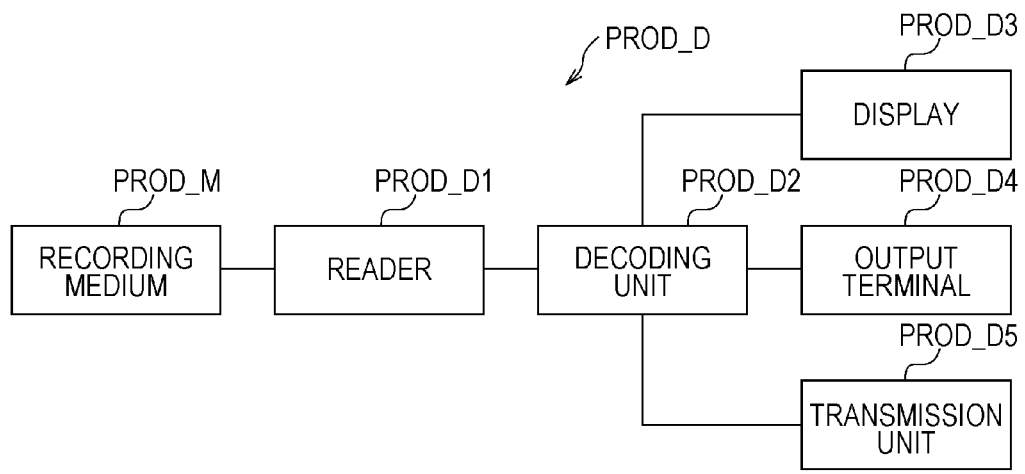

IMAGE DECODING APPARATUS, IMAGE DECODING METHOD, IMAGE CODING APPARATUS, AND IMAGE CODING METHOD

TECHNICAL FIELD

The present invention relates to an image decoding apparatus that decodes coded data representing an image and an image coding apparatus that generates coded data by coding an image.

BACKGROUND ART

A moving image coding apparatus and a moving image decoding apparatus are used to efficiently transfer or record a moving image. The moving image coding apparatus generates coded data by coding a moving image, and the moving image decoding apparatus generates a decoded image by decoding coded data.

Specific moving image coding schemes, for example, include a scheme adopted in KTA software that is joint development codec in H. 264/MPEG-4. AVC, VCEG (Video Coding Expert Group, a scheme adopted in TMuC (Test Model under Consideration) software, and a scheme (Non Patent Literature 1) disclosed in HEVC (High-Efficiency Video Coding) as codec as a successor to the scheme adopted in TMuC.

In these moving image coding schemes, a prediction image is generated based on a locally decoded image that is obtained by coding/decoding an input image. A prediction residue (also referred to as a "difference image" or a "residual image") resulting from subtracting the prediction image from the input image (original image) is coded. The generation methods of the prediction image may include inter-image prediction (inter prediction) and intra-image prediction (intra prediction).

In the inter prediction, a prediction image in a prediction target frame is generated on each prediction unit (such as a block) by applying motion-vector-based motion compensation to a reference signal in a reference frame (decoded image) with the entire portion thereof decoded.

In the intra prediction, on the other hand, prediction images in the frame are successively generated based on a locally decoded image within the same frame. More specifically, in the intra prediction, a prediction mode is normally selected on a per prediction unit basis (such as block) from prediction modes included in a predetermined prediction mode group, and a prediction image is generated based on the prediction method corresponding to the selected prediction mode. The prediction methods include horizontal prediction, vertical prediction, DC prediction, planar prediction, and angular prediction. A unique prediction mode number is assigned to each prediction mode. Based on the prediction mode number decoded from coded data, the moving image decoding apparatus determines the prediction method that is to be applied to a prediction target region. The angular prediction is associated with a prediction mode corresponding to a plurality of prediction directions. The moving image decoding apparatus determines the prediction direction based on the prediction mode number, and generates the prediction image based on the determined prediction direction.

As for the prediction mode of luma, a short code is assigned to an estimation prediction mode derived from a prediction mode of an adjacent prediction unit. On the other hand, as for the prediction mode of chroma, a short code is assigned to an estimation prediction mode that reuses a prediction mode applied to the corresponding luma prediction unit (luma prediction mode reuse).

CITATION LIST

Non Patent Literature

NPL 1: "WD5: Working Draft 5 of High-Efficiency Video Coding (JCTVC-G1103_d3), Joint Collaborative Team on Video Coding (JCT-VC) of ITU-T SG16 WP3 and ISO/IEC JTC1/SC29/WG11 7th Meeting: Geneva, CH, 21-30 Nov. 2011 (disclosed Jan. 9, 2012)

SUMMARY OF INVENTION

Technical Problem

The luma prediction mode reuse is appropriate in a case that the color format (YUV format) of the input image is 4:2:0 format, but suffers from a drop in a coding efficiency in a case that the color format (YUV format) of the input image is 4:2:2 format. This is described more specifically.

According to NPL1, in a case of the luma prediction mode reuse, the same prediction mode as the prediction mode applied to a luma prediction unit is used in the prediction image generation in a target prediction unit of chroma. In a case that the prediction mode is for direction prediction with the color format of the input image being 4:2:0, the prediction direction in a luma domain matches a prediction direction in a chroma domain in the luma prediction mode reuse.

On the other hand, in a case that the color format of the input image is 4:2:2, a size of a region in the chroma domain corresponding to a particular region in the luma domain, if represented in the number of pixels, is equal to half the number of pixels of the luma domain in a horizontal direction. The coordinate system of the chroma pixels is twice in a horizontal direction as large as the coordinate system of the luma pixels. The prediction direction corresponding to the prediction mode in the luma domain does not necessarily match the prediction direction corresponding to the same prediction mode in the chroma domain.

In the technique disclosed in NPL 1, in a case that the color format of the input image is 4:2:2 and that the prediction mode applied to the luma prediction unit is direction prediction, the prediction image generated in the luma prediction mode reuse fails to reflect the size relationship between the luma domain and the chroma domain and is thus inaccurate.

The present invention has developed in view of the above problem, and it is an object of the present invention to provide an image decoding apparatus or the like that improves an image quality of a decoded image by making more accurate a prediction image generated in the luma prediction mode reuse in a case that the pixel shape in the luma domain is not similar to the pixel shape in the chroma domain in the input image.

Solution to Problem

To solve the above problem, an image decoding apparatus of the present invention is configured to reconstruct an image from coded data by generating a prediction image in terms of luma and chroma through intra-prediction method corresponding to a prediction mode. The image decoding apparatus includes a chroma prediction unit that uses the prediction mode corresponding to a prediction direction represented by a gradient with respect to a main direction in the intra prediction method of a direction prediction, and corrects the prediction direction in a case that chroma prediction image generation is performed in accordance with the prediction mode used in luma prediction image generation with a luma pixel and a chroma pixel different from each other in pixel shape.

In the above-described configuration, the prediction mode corresponding to the prediction direction expressed by the gradient with respect to the main direction is used in the intra prediction method of the direction prediction. The main direction is intended to mean a reference direction, and may be one of a vertical direction and a horizontal direction, for example. The gradient is defined by an angle made by the prediction direction and the main direction.

In the above-described configuration, the prediction mode is specified with respect to luma and chroma, the prediction image is generated based on the specified prediction mode.

The prediction mode used in the luma prediction image generation may be used in the chroma prediction image generation. Such a prediction mode performs luma prediction mode reuse, and is referred to as DM mode.

The luma pixel and the chroma pixel may be different in pixel shape as described below.

The pixel is represented by a combination of a luma component (Y) and a chroma component (U, V). In the coding of a moving image, an amount of data may be reduced by lowering the resolution of the chroma pixels below the resolution of the luma pixels.

The image formats to represent an image by a variety of combinations of different resolutions of luma and chroma include a 4:4:4 format, a 4:2:2: format, a 4:1:1 format, and a 4:2:0 format, for example.

In the 4:4:4 format, the resolution of luma is equal to the resolution of chroma.

In the 4:2:2 format, the resolution in a horizontal direction is set to be half the resolution in the 4:4:4 format.

In the 4:1:1 format, the resolution in a horizontal direction is set to be half the resolution in the 4:2:2 format.

In the 4:2:0 format, the resolution of chroma is set to be half the resolution of luma both in a horizontal direction and in a vertical direction.

In the 4:4:4 format and the 4:2:0 format, the luma pixel is equal to the chroma pixel in aspect ratio. In contrast, in the 4:2:2 format and the 4:1:1 format, the luma pixel is different from the chroma pixel in aspect ratio.

The luma pixel different from the chroma pixel in pixel shape is intended to mean that the luma pixel is different from the chroma pixel in aspect ratio and is not similar to the chroma pixel.

In the above-described configuration, the prediction direction is corrected in a case that the chroma prediction image is generated using the DM mode with the luma pixel different from the chroma pixel in pixel shape. A deviation in the prediction direction caused by the fact that the luma pixel and the chroma pixel are not similar to each other is corrected in the DM mode. As a result, the chroma prediction image generated in the luma prediction mode reuse is set to be more accurate. The image quality of a decoded image is thus improved.

In the image decoding apparatus of the present embodiment, the chroma prediction unit may be configured to correct the gradient of the prediction direction based on the main direction and a size ratio of the luma pixel to the chroma pixel.

The prediction direction may be represented in a two-dimensional vector. In a case that relationship $vxL=\alpha \cdot vxC$ and $vyL=\beta \cdot vyC$ holds between a prediction direction vector (vxL, vyL) in the luma space and a prediction direction vector (vxC, VyC) in the chroma space, preferably, the value of a gradient intraPredAngle applied to chroma is $(\alpha/\beta)$ times the value of a gradient intraPredAngle applied to luma with the main direction being a horizontal direction and is $(\beta/\alpha)$ times the value of an angle intraPredAngle applied to luma with the main direction being a vertical direction. The coefficient $\alpha$ represents a size ratio of the luma pixel to the chroma pixel in the horizontal direction, and the coefficient $\beta$ is a size ratio of the luma pixel to the chroma pixel in the vertical direction.

In the above-described configuration, the gradient of the prediction direction is corrected based on the main direction and the size ratio of the luma pixel to the chroma pixel. In the correction, computation is performed to apply the size ratio to a vector representing the prediction direction of luma. Through the computation, a vector representing the prediction direction of luma subsequent to the correction thus results.

Since the gradient of the prediction direction is corrected through the computation, a table to associate the prediction direction of luma with the prediction direction of chroma is not arranged. As a result, a smaller memory size suffices in a chroma prediction image generation process.

In the image decoding apparatus of the present invention, the chroma prediction unit may correct the prediction direction by contracting a prediction image obtained based on the a prediction mode used in the luma prediction image generation, in the main direction at a contraction rate that is determined based on the shape difference between the luma pixel and the chroma pixel.

In the above-described configuration, the correction of the prediction direction is indirectly performed by contracting the luma prediction image to the size of the chroma pixel in the main direction. In this way, the size of luma prediction image is converted to the size of the chroma pixel in accordance with the size (resolution) of a difference between the luma pixel and the chroma pixel.

The chroma prediction pixel is advantageously generated by reusing the luma prediction image.

The image decoding apparatus of the present invention may include a prediction mode conversion table that associates the prediction mode for use in the luma prediction image generation with the prediction mode for use in the chroma prediction image generation. The chroma prediction unit corrects the prediction direction by referencing the prediction mode conversion table to convert the prediction mode.

In the above-described configuration, the prediction mode to be used in the luma prediction image generation is converted to the prediction mode to be used in the chroma prediction image generation. The conversion table associates the prediction mode for use in the luma prediction image generation with the prediction mode for use in the chroma image generation so that the prediction mode of luma and the prediction mode of chroma are in prediction directions having approximately equal gradients.

In the 4:2:2 format, for example, a prediction mode VER+8 of luma may be converted to VER+5 as a prediction mode of chroma. This is described more in detail as below.

In a case that the value of gradient VER+8 is +32 with respect to a horizontal direction, the value of deviation corresponding to VER+8 of chroma is calculated by dividing +32 by 2, namely, is +16.

The gradient of VER+5 may be +17, and may be a gradient with respect to the horizontal direction closest to +16.

The prediction mode VER+8 of luma may be associated with the prediction mode VER+5 of chroma.

In such association, the gradient of the prediction mode VER+5 is +17 in luma and chroma, and the gradient of the prediction mode VER+8 is +32 in luma and chroma.

The gradient to the prediction mode is set to be consistent between the luma and the chroma while the accuracy of the prediction direction is improved through the correction.

In the image decoding apparatus of the present invention, the luma pixel different from the chroma pixel in pixel shape may indicate that a color format is a 4:2:2 format, and the chroma prediction unit may configure a gradient applicable to a chroma to be twice in value as high as a gradient applicable to luma in a case that the main direction is a horizontal direction, and configures the gradient applicable to the chroma to be half in value as high as the gradient applicable to the luma in a case that the main direction is a vertical direction.

In the above-described configuration, the prediction direction is preferably corrected in the 4:2:2 format having a resolution of ½ in a horizontal direction.

To solve the above problems, an image coding apparatus of the present invention is configured to generate a prediction image in terms of luma and chroma through intra prediction method corresponding to a prediction mode and to code a predictive residue resulting from determining a difference between an original image and the prediction image. The image coding apparatus includes a chroma prediction unit that uses the prediction mode corresponding to a prediction direction represented by a gradient with respect to a main direction in the intra prediction method of a direction prediction, and corrects the prediction direction in a case that chroma prediction image generation is performed in accordance with the prediction mode used in luma prediction image generation with a luma pixel and a chroma pixel being different from each other in pixel shape.

In the above-described configuration, the prediction mode corresponding to the prediction direction expressed by the gradient with respect to the main direction is used in the intra prediction method of the direction prediction. The main direction is intended to mean a reference direction, and may be one of a vertical direction and a horizontal direction, for example. The gradient is defined by an angle made by the prediction direction and the main direction.

In the above-described configuration, the prediction mode is specified with respect to luma and chroma, and the prediction image is generated based on the specified prediction mode.

The prediction mode used in the luma prediction image generation may be used in the chroma prediction image generation. Such a prediction mode performs luma prediction mode reuse, and is referred to as DM mode.

Depending on the type of the image format, the luma pixel may be different from the chroma pixel in aspect ratio and may not be similar to the chroma pixel. More specifically, the luma pixel may be different from the chroma pixel in pixel shape.

In the above-described configuration, the prediction direction is corrected in a case that the chroma prediction image is generated using the DM mode with the luma pixel different from the chroma pixel in pixel shape. A deviation in the prediction direction caused by the fact that the luma pixel and the chroma pixel are not similar to each other is corrected in the DM mode. In this way, the prediction direction more suitable for the chroma domain is acquired. As a result, the chroma prediction image generated in the luma prediction mode reuse is set to be more accurate.

Advantageous Effects of Invention

The image decoding apparatus of the present invention includes the chroma prediction unit. The chroma prediction unit uses the prediction mode corresponding to the prediction direction represented by the gradient with respect to the main direction in the intra prediction method of the direction prediction. The chroma prediction unit corrects the prediction direction in a case that the chroma prediction image generation is performed in the prediction mode used in the luma prediction image generation with the luma pixel different from the chroma pixel in pixel shape.

The prediction direction is corrected in the above-described configuration in a case that the chroma prediction image is generated in the DM mode with the luma pixel being different from the chroma pixel in pixel shape. A deviation in the prediction direction caused by the fact that the luma pixel and the chroma pixel are not similar to each other is corrected in the DM mode. In this way, the prediction direction more suitable for the chroma domain is acquired. As a result, the chroma prediction image generated in the luma prediction mode reuse is set to be more accurate. The image quality of a decoded image is thus improved.

The image coding apparatus of the present invention is configured to generate the prediction image in terms of luma and chroma through intra prediction method corresponding to the prediction mode and to code the predictive residue resulting from determining the difference between the original image and the prediction image. The image coding apparatus includes the chroma prediction unit that uses the prediction mode corresponding to the prediction direction represented by the gradient with respect to the main direction in the intra prediction method of the direction prediction, and corrects the prediction direction in a case that the chroma prediction image generation is performed in accordance with the prediction mode used in the luma prediction image generation with the luma pixel and the chroma pixel being different from each other in pixel shape.

In the above-described configuration, the prediction direction is corrected in a case that the chroma prediction image is generated using the DM mode with the luma pixel being different from the chroma pixel in pixel shape. A deviation in the prediction direction caused by the fact that the luma pixel and the chroma pixel are not similar to each other is corrected in the DM mode. The prediction direction more appropriate for the chroma domain is obtained. As a result, the chroma prediction image generated in the luma prediction mode reuse is set to be more accurate.

BRIEF DESCRIPTION OF DRAWINGS

FIG. 3 illustrates a data structure of data that has been coded by a moving image coding apparatus of an embodiment of the present invention and is to be decoded by the moving image decoding apparatus wherein FIG. 3(a) through FIG. 3(d) respectively illustrate a picture layer, a slice layer, a tree block layer, and a CU layer.

FIG. 4 illustrates an example of a prediction mode number corresponding to a classification of intra prediction method used by the moving image decoding apparatus.

FIG. 6 illustrates an example of a prediction mode definition as a definition of correspondence between the intra prediction method and a prediction mode number.

FIG. 8 illustrates a PU configuration order and a PU included in CU with an input image having a YUV format of 4:2:0, wherein FIG. 8(A) illustrates the PU in the CU with the size of the target CU being 8×8 pixels and a partition type being N×N, and wherein FIG. 8(B) illustrates the PU in the CU with the size of the target CU being 16×16 pixels and a partition type being 2N×2N.

FIG. 9 illustrates a PC configuration order and a PU included in CU with an input image has a YUV format of 4:2:2, wherein FIG. 9(A) illustrates the PU in the CU with the size of the target CU being 8×8 pixels and a partition type being N×N, and wherein FIG. 9(B) illustrates the PU in the CU with the size of the target CU being 16×16 pixels and a partition type being 2N×2N.

FIG. 10 illustrates a PU configuration order and a PU included in CU with an input image having a YUV format of 4:2:2, wherein FIG. 10(A) illustrates the PU in the CU with the size of the target CU being 8×8 pixels and a partition type being N×N, and wherein FIG. 10(B) illustrates the PU in the CU with the size of the target CU being 16×16 pixels and a partition type being 2N×2N.

FIG. 13 illustrates an example of table representing an association relationship between a prediction mode identifier and a gradient interaPredAngle value.

FIG. 16 illustrates an example of table that indicates an association relationship between a prediction mode identifier and a gradient interaPredAngle value in a case of the prediction image generation target being a chroma pixel.

FIG. 28 illustrates a table that associates the luma prediction mode and the chroma prediction mode so that the luma prediction mode and the chroma prediction mode are substantially in the same gradient in the color format of 4:2:2.

FIG. 30 illustrates an example of a prediction mode number corresponding to the type of the intra prediction method used in the moving image decoding apparatus.

FIG. 31 illustrates the configuration of a transmission apparatus including the moving image coding apparatus and a receiving apparatus including the moving image decoding apparatus, wherein FIG. 31(a) illustrates the transmission apparatus including the moving image coding apparatus and FIG. 31(b) illustrates the receiving apparatus including the moving image decoding apparatus.

FIG. 32 illustrates the configuration of a recording apparatus including the moving image coding apparatus and a reproducing apparatus including the moving image decoding apparatus, wherein FIG. 32(a) illustrates the recording apparatus including the moving image coding apparatus and FIG. 32(b) illustrates the reproducing apparatus including the moving image decoding apparatus.

DESCRIPTION OF EMBODIMENTS

General Description

Figure 1:
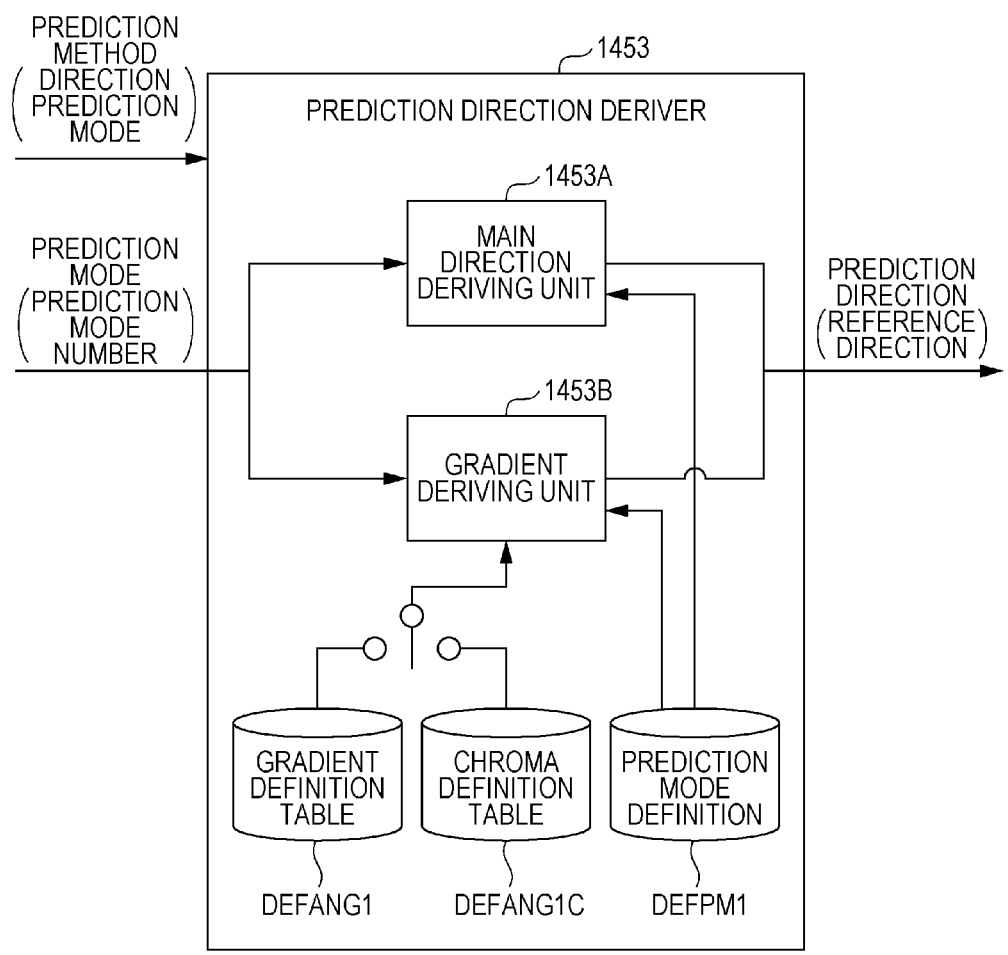
FIG. 1 is a functional block diagram of a configuration example of a prediction direction deriver in a moving image decoding apparatus of an embodiment of the present invention.

An embodiment of the present invention is described with reference to FIG. 1 through FIG. 32. Referring to FIG. 2, a moving image decoding apparatus (image decoding apparatus) 1 and a moving image coding apparatus (image coding apparatus) 2 are briefly described. FIG. 2 is a functional block diagram diagrammatically illustrating the moving image decoding apparatus 1.

The moving image decoding apparatus 1 illustrated in FIG. 2, and the moving image coding apparatus 2 implement a technique adopted in H.264/MPEG-4 AVC standard, a technique adopted in KTA software as joint development codec in VCEG (Video Coding Expert Group), a technique adopted in TMuC (Test Model under Consideration) software, and a technique proposed in HEVC (High-Efficiency Video Coding) as a successor to the TMuC software.

In these moving image coding schemes, the moving image coding apparatus 2 entropy codes a value of syntax that is defined to be transferred from a coder to a decoder, thereby generating coded data #1.

Known as the entropy coding are context-based adaptive variable length coding (CAVLC) and context-based adaptive binary arithmetic coding (CABAC).

In the coding/decoding through CAVLC and CABAC, a process adapted to context is performed. The context refers to a status of coding/decoding (thus, situation), and is determined by past coding/decoding of related syntax. Related syntaxes include various syntaxes related to intra prediction and inter prediction, various syntaxes related to luma and chroma, and various syntaxes related to CU (Coding Unit) size. In CABAC, the location of a binary serving as a coding/decoding target in binary data (binary string) corresponding to the syntax may be used as a context.

In CAVLC, a VLC table for use in coding is adaptively modified to code a variety of syntaxes. In CABAC, on the other hand, a binarization operation is performed on a syntax enabled to take multiple values such as the prediction mode, conversion coefficient, and the like, and binary data resulting from the binarization operation is adaptively arithmetic coded in accordance with event probability. More specifically, a plurality of buffers storing an event probability of a binary value (0 or 1) are prepared, one buffer is selected in accordance with the context, and the arithmetic coding is performed in accordance with the event probability stored on the buffer. The event probability of the buffer is updated in accordance with a binary value to be decoded/coded, and an appropriate event probability is thus maintained based on the context.

The moving image decoding apparatus 1 receives data #1 into which the moving image coding apparatus 2 has coded a moving image. The moving image decoding apparatus 1 decodes the input coded data #1 into a moving image #2 and outputs the moving image #2. The structure of the coded data #1 is described below before the detailed discussion of the moving image decoding apparatus 1.

Structure of Coded Data

The input coded data #1 is generated by the moving image coding apparatus 2 and then decoded by the moving image decoding apparatus 1. The structure of the input coded data #1 is described below with reference to FIG. 3. The input coded data #1 includes a sequence, and a plurality of pictures included in the sequence, for example.

FIG. 3 illustrates a layer structure of a picture layer and lower layers thereof in the input coded data #1. FIG. 3(a) through FIG. 3(d) respectively illustrate a picture layer defining a picture PICT, a slice layer defining a slice S, a tree block layer defining a tree block TBLK, and a coding unit (CU) layer defining a coding unit included in the tree block TBLK.

Picture Layer

The picture layer defines a set of data that the moving image decoding apparatus 1 references to decode a picture PICT (hereinafter also referred to as a target picture) as a process target. As illustrated in FIG. 3(a), the picture PICT includes a picture header, and slices $S_1$ through $S_{NS}$ (NS is a total number of slices included in the picture PICT).

If there is no need to discriminate the slices $S_1$ through $S_{NS}$, the subscript number thereof may be omitted. The same is true of other data with subscript included in the input coded data #1 described below.

The picture header PH includes a coded parameter group that the moving image decoding apparatus 1 references to determine a coding scheme of the target picture. For example, a reference value (pic_init_qp_minus26) in a picture of a quantization step of a prediction residue is an example of the coding parameter included in the picture header PH.

The picture header PH is also referred to a picture parameter set (PPS).

Slice Layer

The slice layer defines a set of data that the moving image decoding apparatus 1 references to decode the slice S as a process target (also referred to as a target slice). Referring to FIG. 3(b), the slice S includes a slice header SH, and tree blocks $TBLK_1$ through $TBLK_{NC}$ (NC is a total number of tree blocks included in the slice S).

The slice header SH includes a coding parameter group that the moving image decoding apparatus 1 references to determine a decoding scheme of the target slice. Slice type specifying information specifying a slice type (slice_type) is an example of the coding parameter included in the slice header SH.

The slice types that are specified by the slice type specifying information may include (1) I slice that uses only the intra prediction during coding, (2) P slice that uses single direction prediction or the intra prediction during coding, and (3) B slice that uses single direction prediction, bidirectional prediction, or the intra prediction.

The slice header SH may include a filter parameter referenced by a loop filter (not illustrated) included in the moving image decoding apparatus 1.

Tree Block Layer

The tree block layer defines a set of data that the moving image decoding apparatus 1 references to decode the tree block TBLK as a process target (also referred to as a target tree block).

The tree block TBLK includes a tree block header TBLKH and coding unit information $CU_1$ through $CU_{NL}$ (NL is a total number of pieces of coding unit information included in the tree block TBLK). The relationship between the tree block TBLK and the coding unit information CU is described below.

The tree block TBLK is divided into units that are used to identify a block size for each of the intra prediction, inter prediction, or conversion.

The unit of the tree block TBLK is recursively subdivided in accordance with the quadtree. A tree structure obtained as a result of recursive quadtree is referred to as a coding tree.

A unit corresponding to a leaf as an end node of the coding tree is referred to as a coding node. Since the coding node is a basic unit for a coding process, the coding node is hereinafter referred to as a coding unit (CU).

More specifically, the coding unit information (hereinafter referred to as CU information) $CU_1$ through $CU_{NL}$ is information corresponding to each coding node (coding unit) that is obtained by recursively quadtree subdividing the tree block TBLK.

The root of the coding tree corresponds to the tree block TBLK. In other words, the tree block TBLK corresponds to the topmost node in the tree structure of the quadtree subdivision recursively including a plurality of coding nodes.

In each of a horizontal direction and a vertical direction, the size of each coding node of interest is half the size of a coding node to which the coding node directly belongs (namely, a unit of the node one layer above the coding node of interest).

The size taken by each coding node depends on the size of the tree block and the size specifying information of the coding node included in a sequence parameter set SPS of the input coded data #1. Since the tree block becomes the root of the coding node, the maximum size of the coding node is the size of the tree block. Since the maximum size of the tree block matches the maximum size of the coding node (CU), the tree block may be occasionally referred to as LCU (Largest CU). The minimum size may be, as the size specifying information, a minimum coding node size (Log 2_min_coding_block_size_minus3) or a difference between the maximum and the minimum coding node sizes (log 2_diff_max_min_coding_block_size). The size specifying information of the coding node used in a typical configuration is 64×64 pixels as the maximum coding node size is and 8×8 pixels as the minimum coding node size. In such a case, the size of the coding node and the coding unit CU may be 64×64 pixels, 32×32 pixels, 16×16 pixels, or 8×8 pixels.

Tree Block Header

The tree block header TBLKH includes a coding parameter that the moving image decoding apparatus 1 references to determine a decoding scheme of the target tree block. More specifically as illustrated in FIG. 3(c), the tree block header TBLKH includes tree block split information SP_TBLK that specifies a split pattern of the target tree block to each CU and a quantization parameter difference Δqp (qp_delta) that specifies the magnitude of a quantization step.

The tree block split information SP_TBLK represents a coding tree that is to split the tree block. More specifically, the tree block split information SP_TBLK specifies the shape and size of each CU included in the target tree block and the location of each CU in the target tree block.

The tree block split information SP_TBLK may not necessarily have to explicitly include the shape and size of the CU. For example, the tree block split information SP_TBLK may be a set of flags (split_coding_unit_flag) indicating whether the whole target tree block or a partial area of the tree block is to be split into four regions or not. In such a case, the shape and size of the tree block may also be included to identify the shape and size of the CU.

The quantization parameter difference Δqp (qp_delta) is a difference qp−qp' between a quantization parameter qp in the target tree block and a quantization parameter qp' in the tree block that is coded immediately prior to the target tree block.

CU Layer

The CU layer defines a set of data that the moving image decoding apparatus 1 references to decode a CU as a process target (hereinafter also referred to as a target CU).

A tree structure of data included in the CU is described before the detailed description of the data included in the CU information CU. The coding node becomes a root node for a prediction tree (PT) and a transform tree (TT). The prediction tree and the transform tree are described below.

In the prediction tree, the coding node is divided into one or more prediction blocks, and the location and size of each prediction block is defined. In other words, the prediction block is one or more regions having no overlapping portion therebetween and forming the coding node. The prediction tree includes one or more prediction blocks obtained as a result of the split described above.

A prediction process is performed on a per prediction block basis. The prediction block as a prediction unit is also referred to as a prediction unit (PU).

Generally speaking, the types of split in the prediction tree is two, one for the intra prediction and the other for the inter prediction.

The split method for the intra prediction includes 2N×2N (the same size as the coding node), and N×N.

The split method for the inter prediction includes 2N×2N (the same size as the coding node), 2N×N, N×2N, and N×N.

In the transform tree, the coding node is divided into one or more transform blocks, and the location and size of each transform block are defined. In other words, the transform block is one or more regions having no overlapping portion therebetween and forming the coding node. The transform tree includes one or more transform blocks obtained as a result of the split described above.

A transform process is performed on a per transform block basis. The transform block as a transform unit is also referred to as a transform unit (TU).

Data Structure of CU Information

Specific structure of the data included in the CU information CU is described with reference to FIG. 3(d). Referring to FIG. 3(d), the CU information CU specifically includes a skip flag SKIP, PT information PTI, and TT information TTI.

The skip flag SKIP indicates whether a skip mode has been applied to the target PU. If the value of the skip flag SKIP is 1, namely, if the skip mode has been applied to the target CU, the PT information PTI and the TT information TTI in the CU information CU are omitted. Note that the skip flag SKIP is omitted in the I slice.

The PT information PTI relates to PT included in the CU. In other words, the PT information PTI is a set of information related to each of the one or more PUs included in PT, and is referenced by the moving image decoding apparatus 1 in the generation of the prediction image. As illustrated in FIG. 3(d), the PT information PTI includes prediction type information PType and prediction information PInfo.

The prediction type information PType specifies which prediction, the intra prediction or the inter prediction, to use as a prediction image generation method of the target PU.

The prediction information PInfo includes intra prediction information or inter prediction information depending on which prediction method the prediction type information PType specifies. In the following discussion, the PU with the intra prediction applied thereto is referred to as an intra PU, and the PU with the inter prediction applied thereto is referred to as an inter PU.

The prediction information PInfo also includes information that specifies the shape, size, and location of the target PU. As described above, the generation of the prediction image is performed by PU as a unit. The prediction information PInfo is described in detail below.

The TT information TTI relates to TT included in the CU. In other words, The TT information TTI is a set of information related to each of the one or more TUs included in the TT, and is referenced by the moving image decoding apparatus 1 in the decoding of residual data. Note that TU is also referred to as the transform block.

As illustrated in FIG. 3(d), the TT information TTI includes TT split information SP_TU specifying a split pattern of the target CU to each transform block, and TU information $TUI_1$ through $TUI_{NT}$ (NT is a total number of transform blocks included in the target CU).

The TT split information SP_TU determines the shape and size of each TU included in the target CU and the location of the TU in the target CU. For example, the TT split information SP_TU includes information as to whether to split the target node (split_transform_unit_flag) and information indicating the split depth (trafoDepth).

In a case of the CU size of 64×64 pixels, the TU may take a size ranging from 4×4 pixels to 32×32 pixels as a result of splitting.

The TU split information SP_TU includes information as to whether each TU includes a non-zero transform coefficient or not. For example, the TU split information SP_TU includes information related to the presence or absence of the non-zero coefficient of each TU (Coded Block Flag: CBP), and information related to the presence or absence of the non-zero coefficient of a plurality of TUs (no_residual_data_flag).

The TU information $TUI_1$ through $TUI_{NT}$ is each piece of information related to one or more TUs included in the TT. For example, the TU information TUI includes a quantization prediction residue.

Each quantization prediction residue is coded data that the moving image coding apparatus 2 generates by performing the following processes 1 through 3 on a target block as a process target.

Process 1: The moving image coding apparatus 2 DCT transforms (Discrete Cosine Transform) the prediction residue that is obtained by subtracting a prediction image from a coding target image.

Process 2: The moving image coding apparatus 2 quantizes the transform coefficient obtained in the process 1.

Process 3: The moving image coding apparatus 2 variable length codes the transform coefficient quantized in the process 2.

The quantization parameter qp represents the magnitude of a quantization step QP that the moving image coding apparatus 2 has used to quantize the transform coefficient ($QP=2^{qp/6}$).

Prediction Information PInfo

As described above, there are two types of the prediction information PInfo, inter prediction information and intra prediction information.

The inter prediction information includes a coding parameter that the moving image decoding apparatus 1 references to generate an inter prediction image through the inter prediction. More specifically, the inter prediction information includes inter PU split information that specifies a split pattern of the target CU to each inter PU, and an inter prediction parameter of each inter PU.

The inter prediction parameter includes a reference image index, an estimation motion vector index, and a motion vector residue.

On the other hand, the intra prediction information includes a coding parameter that the moving image decoding apparatus 1 references to generate an intra prediction image through the intra prediction. More specifically, the intra prediction information includes intra PU split information that specifies a split pattern of the target CU to each intra PU, and an intra prediction parameter of each intra PU. The intra prediction parameter is used to decode the intra prediction (prediction mode) of each intra PU.

The parameters to decode the prediction mode includes mpm_flag that is a flag related to MPM (Most Probable Mode, hereinafter MPM), mpm_idx that is an index to select MPM, and rem_idx that is an index to specify a prediction mode other than MPM. MPM is an estimation prediction mode that may be selected in a target partition with a higher probability. For example, MPM includes an estimation prediction mode that is estimated based on a prediction mode assigned to a partition surrounding the target partition, and a DC mode and a planar mode with a generally higher event probability.

In the following discussion, the term "prediction mode" indicates a luma prediction mode. The term "chroma prediction mode" is discriminated from the luma prediction mode. The parameters to decode the prediction mode includes chroma_mode that specifies the chroma prediction mode.

Parameters mpm_flag, mpm_idx, rem_idx, and chroma_mode are described in detail below.

Parameters mpm_flag and rem_index respectively correspond to "prev_intra_luma_pred_flag" and "rem_intra_luma_pred_mode" in NPL 1. Parameter chroma_mode corresponds to "intra_chroma_pred_mode".

Moving Image Decoding Apparatus

The configuration of the moving image decoding apparatus 1 of the present embodiment is described with reference to FIG. 1 through FIG. 20.

Summary of Moving Image Decoding Apparatus

The moving image decoding apparatus 1 generates a prediction image on each PU, generates a decoded image #2 by summing the generated prediction image and a prediction residue decoded from coded data #1, and outputs the decoded image #2 to the outside.

The prediction image is generated by referencing a coding parameter that is obtained by decoding the coded data #1. The coding parameter is a parameter that is referenced to generate the prediction image. The coding parameter includes the size and shape of the PU, the size and shape of the block, and residual data between the original image and the prediction image, in addition to prediction parameters including a motion vector to be referenced in an inter prediction and a prediction mode to be referenced in an intra prediction. In the following discussion, a set of all information included in the coding parameter other than the residual data is referred to as side information.

In the following discussion, a picture (frame), a slice, a tree block, a CU, a block, and a PU, each as a decoding target, are respectively referred to as a target picture, a target slice, a target tree block, a target CU, a target block, and a target PU.

The size of the tree block is 64×64 pixels, the size of the CU is 64×64 pixels, 32×32 pixels, 16×16 pixels, or 8×8 pixels, and the size of the PU is 64×64 pixels, 32×32 pixels, 16×16 pixels, 8×8 pixels, or 4×4 pixels, for example. Those sizes are described herein for exemplary purposes only. The tree block, the CU, and the PU may also take a size other than those described above. In particular, in a case that the color format is 4:2:2, the PU may preferably take one of the sizes of 32×64 pixels, 16×32 pixels, 8×16 pixels, or 4×8 pixels. In an image of a color format 4:2:2, the chroma pixel has a landscape shape with an aspect ratio of vertical:horizontal=1:2. In the chroma domain, an area having the number of pixels in a vertical direction twice the number of pixels in a horizontal direction visually looks like a square shape.

Configuration of Moving Image Decoding Apparatus

Referring back to FIG. 2, the configuration of the moving image decoding apparatus 1 is briefly described. FIG. 2 is a functional block diagram diagrammatically illustrating the moving image decoding apparatus 1.

As described in FIG. 2, the moving image decoding apparatus 1 includes a variable length decoder 11, a dequantization and inverse transformation unit 13, a prediction image generator 14, an adder 15, and a frame memory 16.

Variable Length Decoder

The variable length decoder 11 decodes a variety of parameters included in the coded data #1 input to the moving image decoding apparatus 1. The following discussion is based on the premise that the moving image decoding apparatus 1 decodes a parameter coded through entropy coding scheme, such as CABAC, CAVLC, or the like, as appropriate. More specifically, the variable length decoder 11 decodes one frame of the coded data #1 in the following procedure.

The variable length decoder 11 demultiplexes one frame of the coded data #1, thereby separating one piece of information from another piece of information in the layer structure of FIG. 3. For example, the variable length decoder 11 references information included in various headers and separates a slice and a tree block from the coded data #1.

The various headers include (1) information related to the split method of splitting the target picture into the slices, and (2) information related to the size and shape of the tree block belonging to the target slice and the location of the tree block within the target slice.

The variable length decoder 11 references the tree block split information SP_TBLK included in the tree block header TBLKH and splits the target tree block into CUs. The variable length decoder 11 decodes the TT information TTI related to the transform tree obtained for the target CU, and the PT information PTI related to the prediction tree obtained for the target CU.

As previously described, the TT information TTI includes the TU information TUI corresponding to the TU included in the transform tree. Also, as previously described, the PT information PTI includes the PU information PUI corresponding to the PU included in the target prediction tree.

The variable length decoder 11 supplies the TT information TTI obtained for the target CU to a TU information decoder 12. The variable length decoder 11 supplies the PT information PTI obtained for the target CU to the prediction image generator 14. The configuration of the variable length decoder 11 is described more in detail below.

Dequantization and Inverse Transformation Unit

The dequatization and inverse transformation unit 13 performs a dequantization and inverse transformation process. More specifically, the dequantization and inverse transformation unit 13 reconstructs a prediction residue D of each pixel by performing the quantization and inverse orthogonal transformation process on a quantization prediction residue included in the TU information TUI corresponding to the target TU. The orthogonal transformation herein refers to orthogonal transformation from the pixel domain to the frequency domain. The inverse orthogonal transformation thus refers to transformation from the frequency domain to the pixel domain. Examples of the inverse orthogonal transformation includes inverse DCT transform (inverse discrete cosine transform), and inverse DST transform (inverse discrete sine transform). The dequantization and inverse transformation unit 13 supplies the reconstructed prediction residue D to the adder 15.

Prediction Image Generator

The prediction image generator 14 generates the prediction image of each PU included in the target CU based on the PT information PTI. More specifically, the prediction image generator 14 generates a prediction image Pred from a locally decoded image P' as a decoded image by performing the intra prediction or the inter prediction on the parameter included in the PU information PUI corresponding to each target PU. The prediction image generator 14 then supplies the generated prediction image Pred to the adder 15. The configuration of the prediction image generator 14 is described more in detail below.

Adder

The adder 15 generates the decoded image P of the target CU by adding the prediction residue D supplied from the dequantization and inverse transformation unit 13 to the prediction image Pred supplied from the prediction image generator 14.

Frame Memory

The frame memory 16 successively stores the decoded images P. At the time of decoding the target tree block, the frame memory 16 stores the decoded images corresponding to all the tree blocks decoded prior to the target tree block (for example, all the prior tree blocks in a raster scan order).

At the time of decoding the target CU, the decoded images corresponding to all the CUs decoded prior to the target CU are also stored.

At the completion of a tree-block-unit-basis decoded image generation process on all the tree blocks in an image, the moving image decoding apparatus 1 outputs to the outside the decoded image #2 corresponding to one frame of the coded data #1 input thereto.

Definition of Prediction Mode

As previously described, the prediction image generator 14 generates the prediction image based on the PT information PTI and outputs the generated prediction image. If the target CU is an intra CU, the PT information PTI input to the prediction image generator 14 includes a prediction mode (IntraPredMode), and a chroma prediction mode (IntraPredModeC). The definition of the prediction mode (of luma and chroma) is described below with reference to FIG. 4 through FIG. 6.

Summary

FIG. 4 illustrates an example of a prediction mode number corresponding to a classification of intra prediction scheme used by the moving image decoding apparatus 1. Prediction mode number '0' is assigned to planar prediction (Intra_Planar), prediction mode number '1' is assigned to vertical prediction (Intra_Vertical), prediction mode number '2' is assigned to horizontal prediction (Intra_Horizontal), prediction mode number '3' is assigned to DC prediction (Intra_DC), prediction mode numbers '4' through '34' are assigned to angular prediction (Intra_Angular), and prediction mode number '35' is assigned to LM prediction (Intra_FromLuma). The LM prediction predicts a pixel value of a chroma pixel based on the decoded pixel value of luma, and is selectable in a case of the chroma prediction. The other prediction modes are selectable in each of the luma and chroma predictions. The horizontal prediction, the vertical prediction, and the angular prediction are collectively referred to as a direction prediction. In the direction prediction, a prediction image is generated by extrapolating an adjacent pixel value surrounding the target PU to a specific direction. Generally, the horizontal prediction and the vertical prediction are combined into the angular prediction and that angular prediction is used as the same meaning as the direction prediction. For convenience of explanation, however, these predictions are discriminated from each other.

Figure 5:
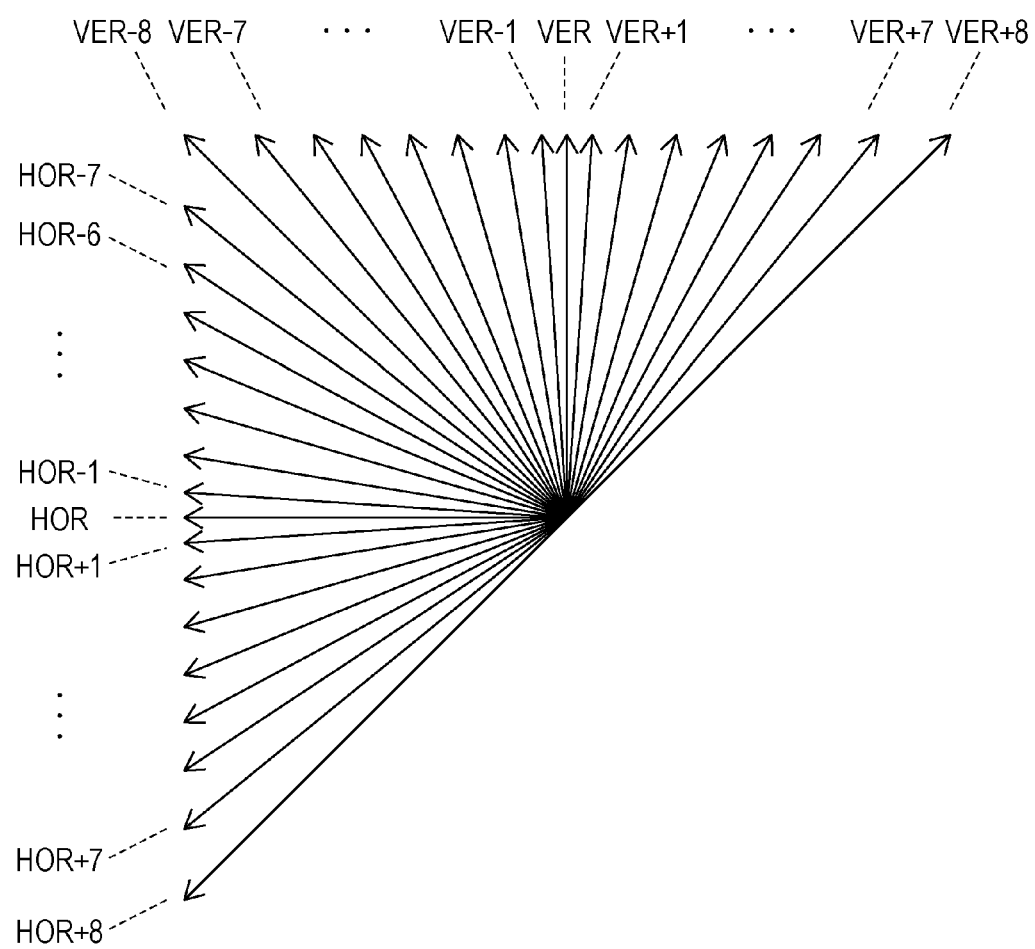
FIG. 5 illustrates prediction directions corresponding to the identifiers of 33 types of prediction modes of the prediction direction.

An identifier of each prediction mode included in the direction prediction is described with reference to FIG. 5. FIG. 5 illustrates prediction directions corresponding to the identifiers of 33 types of prediction mode belonging to the prediction direction. The direction of an arrow of FIG. 5 indicates a prediction direction, but more precisely, indicates the direction of a vector extending from a prediction target pixel to a decoded pixel to be referenced by the prediction target pixel. In that sense, the prediction direction is referred to as a reference direction. The identifier of each prediction mode is a combination of a sign indicating whether the main direction or the axis is in a horizontal (HOR) direction or a vertical (VER) direction, and a deviation from the main direction. For example, HOR is assigned to the horizontal prediction, VER is assigned to the vertical prediction, VER+8 is assigned to a prediction mode that references a surrounding pixel at a 45 degree rising to the right direction, VER−8 is assigned to a prediction mode that references a surrounding pixel at a 45 degree rising to the left direction, and HOR+8 is assigned to a prediction mode that references a surrounding pixel at a 45 degree falling to the left direction. In the direction prediction, 17 prediction modes VER−8 through VER+8 having the vertical direction as the main direction thereof are defined, and 16 prediction modes HOR−7 through HOR+8 having the horizontal direction as the main direction thereof are defined. The prediction direction has been described for exemplary purposes. Any expression in the prediction direction is acceptable as long as the expression is associated with a prediction direction. For example, numbers uniquely respectively identifying all the prediction directions may be used.

The association between the intra prediction method and the prediction mode used in the moving image decoding apparatus 1 may be defined as listed in FIG. 6. FIG. 6 illustrates an example of a prediction mode definition DEFPM1 as a definition of the association between the intra prediction method and the prediction mode number. In the prediction mode definition DEFPM1 of FIG. 6, prediction mode number '0' is assigned to the planar prediction, prediction mode number '1' is assigned to the vertical prediction, prediction mode number '2' is assigned to the horizontal prediction, and prediction mode number '3' is assigned to the DC prediction. Prediction mode numbers '4' through '18' are assigned to the angular prediction modes, each having a deviation as an even number from the main direction, in the order from small to large deviation. Given the same deviation, the vertical direction is arranged first, followed by the horizontal direction. Prediction mode numbers '19' through '35' are assigned to the angular prediction modes, each having a deviation as an odd number from the main direction, in the order from small to large deviation. Given the same deviation, the vertical direction is arranged first, followed by the horizontal direction.

Detail of Prediction Image Generator

Figure 7:
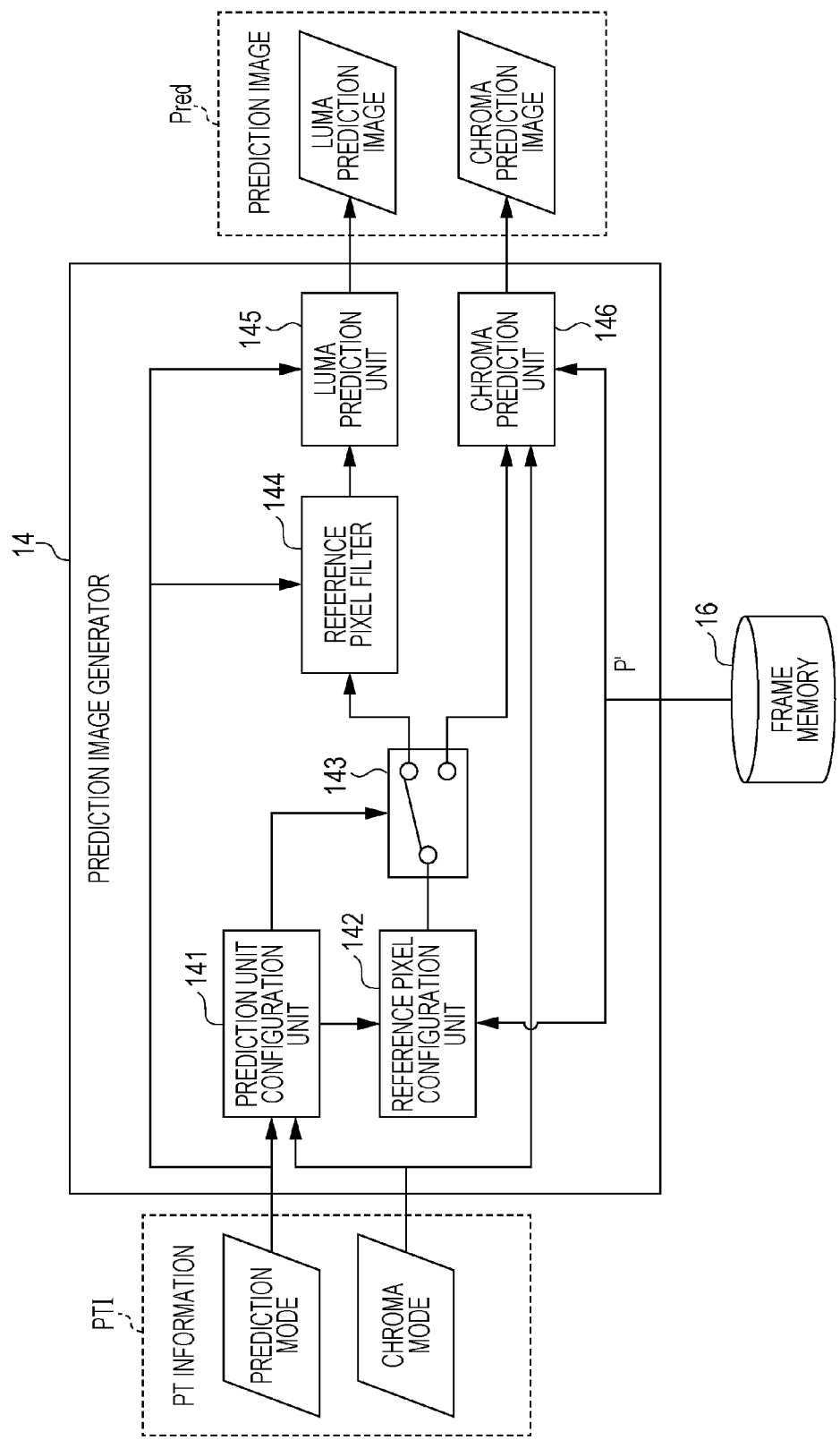
FIG. 7 is a functional block diagram illustrating a configuration example of a prediction image generator in the moving image decoding apparatus.

The configuration of the prediction image generator 14 is described more in detail with reference to FIG. 7. FIG. 7 is a functional block diagram illustrating the configuration example of the prediction image generator 14. The functional blocks related to the prediction image generation of the intra CU from among the functions of the prediction image generator 14 are illustrated herein.

Referring to FIG. 7, the prediction image generator 14 includes a prediction unit configuration unit 141, a reference pixel configuration unit 142, a switch 143, a reference pixel filter 144, a luma prediction unit 145, and a chroma prediction unit 146.

The prediction unit configuration unit 141 configures a PU included in the target CU as a target PU in a defined configuration order, and outputs information related to the target PU (target PU information). The target PU information includes, at least, the size of the target PU, the location of the target PU in the CU, an index indicating the luma or chroma plane of the target PU (luma and chroma index cIdx).

In a case that the input image is in a YUV format, the configuration order of the PU corresponding to Y included in the target CU is configured in the raster scan order, and the PU corresponding to U and V is configured in the raster scan order.

The configuration order of the PU and the PU included in the CU with the input image being in a 4:2:0 YUV format are described with reference to FIG. 8.

FIG. 8(A) illustrates the PU in the CU with the size of the target CU being 8×8 pixels and the split type being N×N. Four PUs with each including 4×4 pixels of the luma Y are configured in the raster scan order (PU_Y0, PU_Y1, PU_Y2, and PU_Y3). Next, a single PU (PU_U0) having 4×4 pixels of the chroma U is configured. Lastly, a single prediction unit (PU_V0) having 4×4 pixels of the chroma V is configured.

FIG. 8(B) illustrates the PU in the CU with the size of the target CU being 16×16 pixels and the split type being 2N×2N. A single prediction unit (PU_Y0) having 16×16 pixels of the luma Y is configured. Next, a single prediction unit (PU_U0) having 8×8 pixels of the chroma U is configured. Lastly, a single prediction unit (PU_V0) having 8×8 pixels of the chroma V is configured.

The configuration order of the PU and the PU included in the CU with the input image being in a 4:2:2 YUV format are described with reference to FIG. 9.

FIG. 9(A) illustrates the PU in the CU with the size of the target CU being 8×8 pixels and the split type being N×N. Four PUs with each including 4×4 pixels of the luma Y are configured in the raster scan order (PU_Y0, PU_Y1, PU_Y2, and PU_Y3). Next, a single PU (PU_U0) having 4×8 pixels of the chroma U is configured. Lastly, a single prediction unit (PU_V0) having 4×8 pixels of the chroma V is configured.

FIG. 9(B) illustrates the PU in the CU with the size of the target CU being 16×16 pixels and the split type being 2N×2N. A single prediction unit (PU_Y0) having 16×16 pixels of the luma Y is configured. Next, a single prediction unit (PU_U0) having 8×16 pixels of the chroma U is configured. Lastly, a single prediction unit (PU_V0) having 8×16 pixels of the chroma V is configured.

FIG. 10 illustrates another PU configuration. FIG. 10(A) illustrates another PU in the CU with the size of the target CU being 8×8 pixels and the split type being N×N. Four PUs with each including 4×4 pixels of the luma Y are configured in the raster scan order (PU_Y0, PU_Y1, PU_Y2, and PU_Y3). Next, two PUs (PU_U0 and PU_U1), each having 4×4 pixels of the chroma U, are configured. Lastly, two PUs (PU_V0 and PU_V1), each having 4×4 pixels of the chroma V, are configured.

FIG. 10(B) illustrates the split type of 2N×2N, and the same PU configuration as that of FIG. 9(B).

In the discussion that follows, the splitting of FIG. 9 is used. The same process is applicable in each PU of the chroma in a case that the splitting of FIG. 10 is used.

The reference pixel configuration unit 142 reads a pixel value (decoded pixel value) of a decoded image surrounding the target PU stored on the frame memory in accordance with the input target PU information, and then configures a reference signal that is to be referenced during the prediction image generation. A reference pixel value p(x,y) is configured using the decoded pixel value r(x,y) in accordance with the following formulas.

$$p(x,y)=r(xB+x,yB+y) \quad x=-1, y=-1 \ldots (nS*2-1), \text{ and}$$
$$x=0 \ldots (nS*2-1), y=-1$$

where (xB,yB) represents the location of the top left pixel in the target PU, nS represents the size of the target PU, namely, the width or the height of the target PU whichever is larger. In the above formulas, decoded pixel values of a line of the decoded pixels adjacent to each other along the upper side of the target PU and decoded pixel values of a column of decoded pixels adjacent to each other along the right hand side of the target PU are basically copied to the corresponding reference pixel values. If a decoded pixel value corresponding to a particular reference pixel location is not present or is difficult to reference, a predetermined value may be used or a decoded pixel value that is present in the vicinity of the corresponding decoded pixel value and is enabled to be referenced may be used.

In response to the input target PU, the switch 143 determines whether the target PU is luma or chroma, and outputs the input reference pixel at the corresponding output direction.

The reference pixel filter 144 performs a filtering operation on the input reference pixel value in response to the input prediction mode, and then outputs the filtered reference pixel value. More specifically, depending on the target PU size and the prediction mode, the reference pixel filter 144 determines whether to perform the filtering operation.

The luma prediction unit 145 generates a luma prediction image of the target PU based on the input prediction mode and reference pixel, and outputs the generated luma prediction image. The luma prediction unit 145 is described more in detail below.

The chroma prediction unit 146 generates a chroma prediction image of the target PU based on the input prediction mode and reference pixel, and outputs the chroma prediction image. The chroma prediction unit 146 is described more in detail below.

Flow of Prediction Image Generation Process

Figure 11:
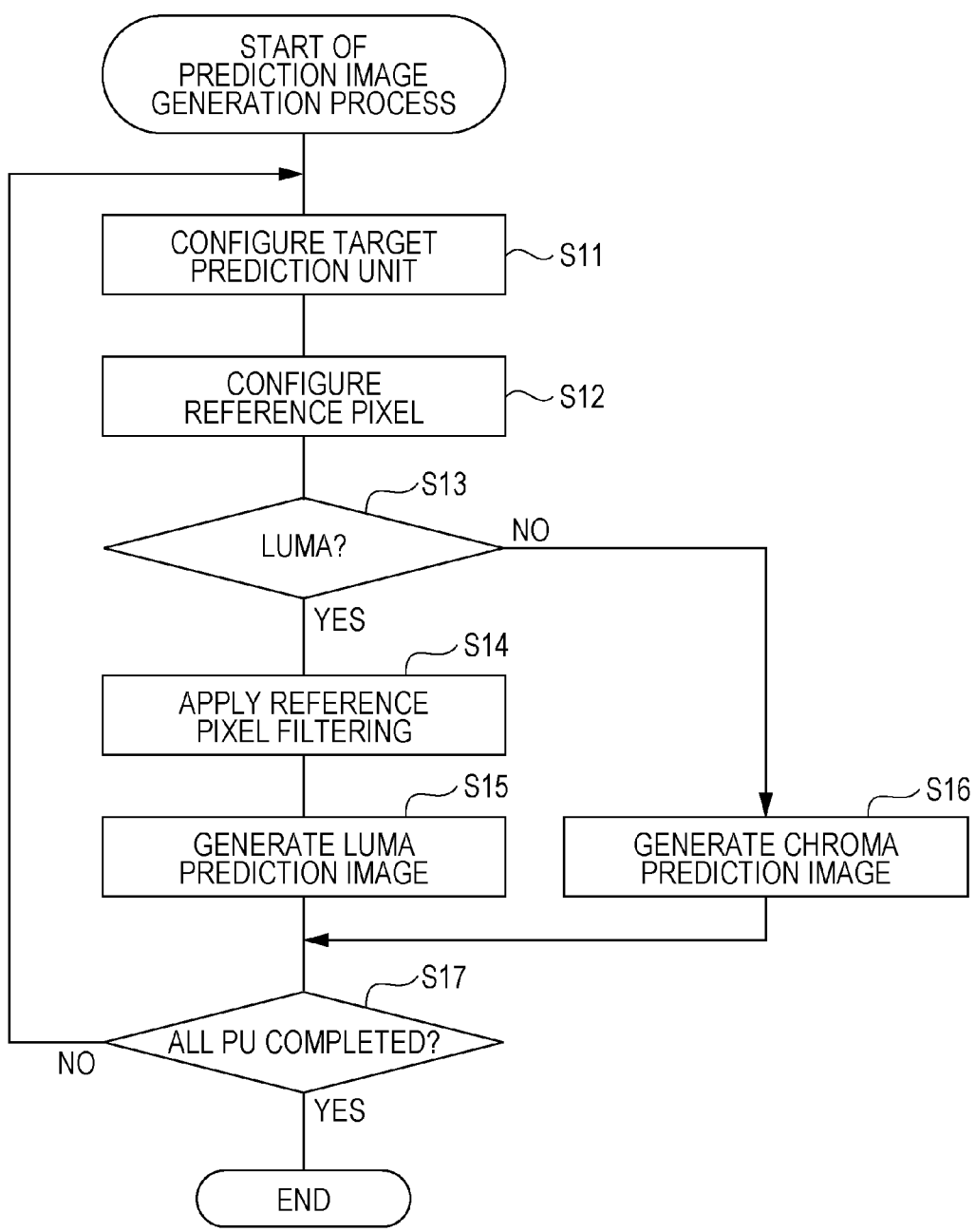
FIG. 11 is a flowchart illustrating a prediction image generation process by CU unit performed by the prediction image generator.

The prediction image generation process of each CU unit performed by the prediction image generator 14 is described with reference to a flowchart of FIG. 11. In response to the start of the prediction image generation process of each CU unit, the prediction unit configuration unit 141 configures one of the PUs included in the CU as a target PU in a predetermined order, and then outputs information about the target PU to the reference pixel configuration unit 142 and the switch 143 (S11). The reference pixel configuration unit 142 configures the reference pixel of the target PU using the decoded pixel value read from an external frame memory (S12). In response to the input target PU information, the switch 143 determines whether the target PU is luma or chroma and switches an output connection in response to the determination (S13).

If the target PU is luma (YES branch from S13), the output of the switch 143 is connected to the reference pixel filter 144. The reference signal is input to the reference pixel filter 144. The reference pixel filter 144 performs the filtering operation on the reference pixel in accordance with the separately input prediction mode, and the filtered reference pixel is then output to the luma prediction unit 145 (S14). The luma prediction unit 145 generates a luma prediction image based on the input reference pixel and the prediction mode, and outputs the luma prediction pixel (S15).

On the other hand, if the target PU is chroma (NO branch from S13), the output of the switch 143 is connected to the chroma prediction unit 146. The chroma prediction unit 146 performs a chroma prediction image of the target PU based on the input reference pixel and prediction mode, and outputs the chroma prediction image (S16). At the completion of the luma or chroma prediction image of the target PU, the prediction unit configuration unit 141 determines whether the prediction images of all PUs in the target CU are generated (S17). If the prediction images of some PUs in the target CU are not generated (NO branch from S17), the prediction unit configuration unit 141 returns to S1 to execute the prediction image generation process on a next PU in the target CU. If the prediction images of all PUs in the target CU are generated (YES branch from S17), the prediction unit configuration unit 141 combines the prediction images of the luma and chroma of each PU in the target CU as a prediction image of the target CU and then outputs the prediction image of the target CU. Processing is thus complete.

Detail of Luma Prediction Unit

Figure 12:
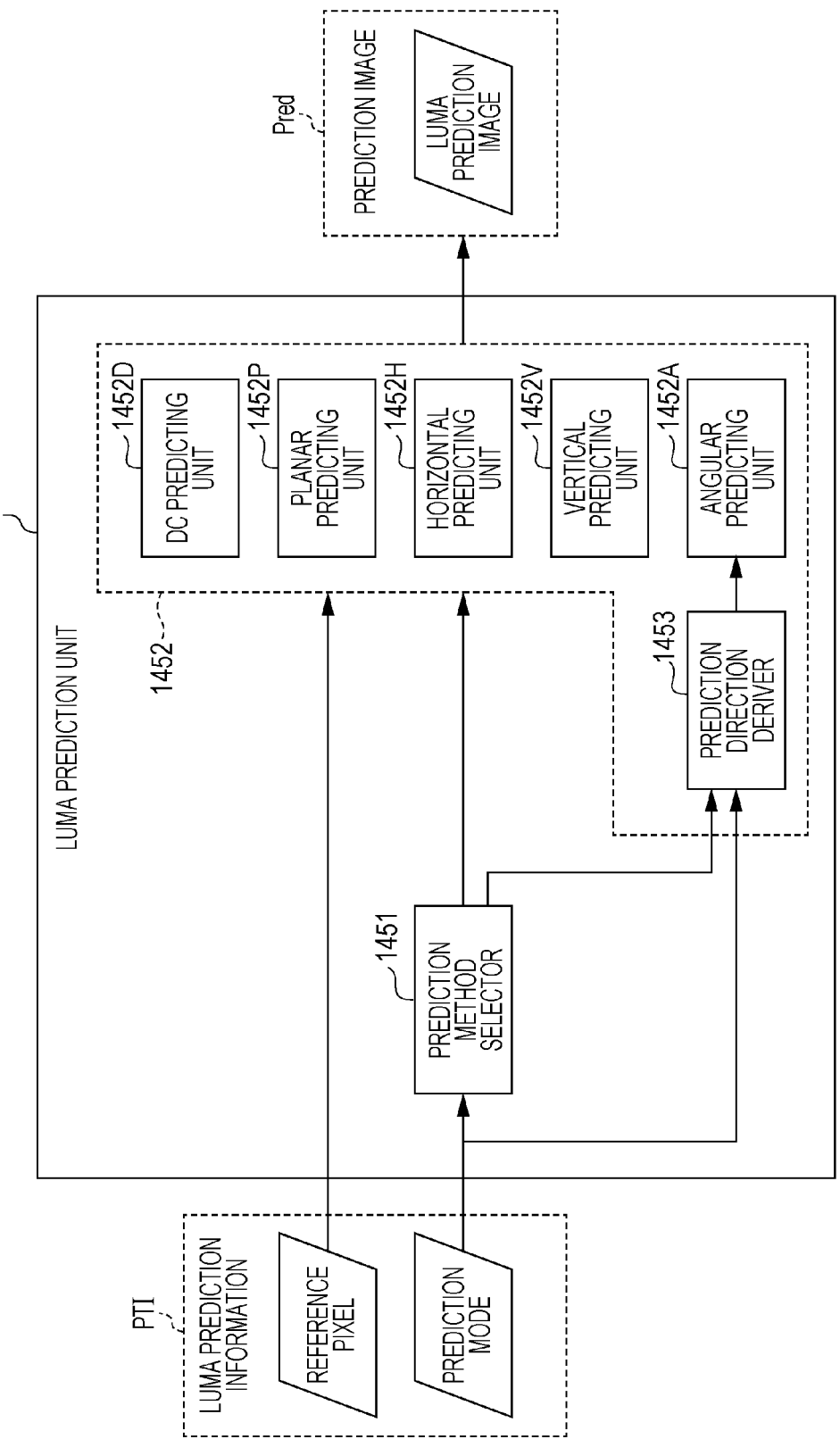
FIG. 12 is a block diagram illustrating a detailed configuration of a luma prediction unit in the prediction image generator.

The luma prediction unit 145 is described in detail with reference to FIG. 12. FIG. 12 is a block diagram illustrating a detailed configuration of the luma prediction unit 145. As illustrated in FIG. 12, the luma prediction unit 145 includes a prediction method selector 1451 and a prediction image deriver 1452.

The prediction method selector 1451 selects a prediction method to be used in the prediction image generation process based on the input prediction mode and outputs the selection result. The selection of the prediction method may be performed by selecting the prediction method corresponding to the prediction mode number of the input prediction mode in accordance with the definition of FIG. 4.

The prediction image deriver 1452 derives the prediction image responsive to the selection result of the prediction method output by the prediction method selector 1451. More specifically, the prediction image deriver 1452 includes a DC predicting unit 1452D, a planar predicting unit 1452P, a horizontal predicting unit 1452H, a vertical predicting unit 1452V, an angular predicting unit 1452A, and a prediction direction deriver 1453. If the prediction method is the planar prediction, the vertical prediction, the horizontal prediction, the DC prediction, or the angular prediction, the prediction image deriver 1452 derives the prediction image using the planar predicting unit 1452P, the vertical predicting unit 1452V, the horizontal predicting unit 1452H, or the angular predicting unit 1452A, respectively.

The DC predicting unit 1452D derives a DC prediction value corresponding to a mean value of pixel values of the input reference pixels, and then outputs a prediction image having the derived DC prediction value as a pixel value.

The planar predicting unit 1452P derives a pixel value by linearly summing a plurality of reference pixels in accordance with distances to a prediction target pixel, generates a prediction image based on the pixel value, and outputs the prediction image. For example, a pixel value predSamples [x,y] of a prediction image is derived using the reference pixel value p[x,y] and a size nS of the target PU in accordance with the following formula.

$$predSamples[x,y]=((nS-1-x)*p[-1,y]+(x+1)*p[nS,-1]+(nS-1-y)*p[x,-1]+(y+1)*p[-1,nS]+nS)>>(k+1)$$

where x, y=0 . . . nS−1 and k=log 2(nS).

The horizontal predicting unit 1452H generates a prediction image by interpolating adjacent pixels along the left side of the target PU in a horizontal direction in response to the input reference pixel, and outputs the resulting prediction image.

The vertical predicting unit 1452V generates a prediction image by extrapolating adjacent pixels along the top side of the target PU in a vertical direction in response to the input reference pixel, and outputs the resulting prediction image.

If the input prediction mode is a direction prediction mode, the prediction direction deriver 1453 determines a prediction direction (reference direction) related to the prediction mode and outputs the prediction direction. The output prediction direction is expressed by a combination of a main direction flag bRefVer indicating whether the main direction is a vertical direction or not and a gradient (offset) intraPredAngle of the prediction direction with respect to the main direction. If the value of the main direction flag bRefVer is 0, the main direction indicates a horizontal direction, and if the value of the main direction flag bRefVer is 1, the main direction indicates a vertical direction.

Figure 2:
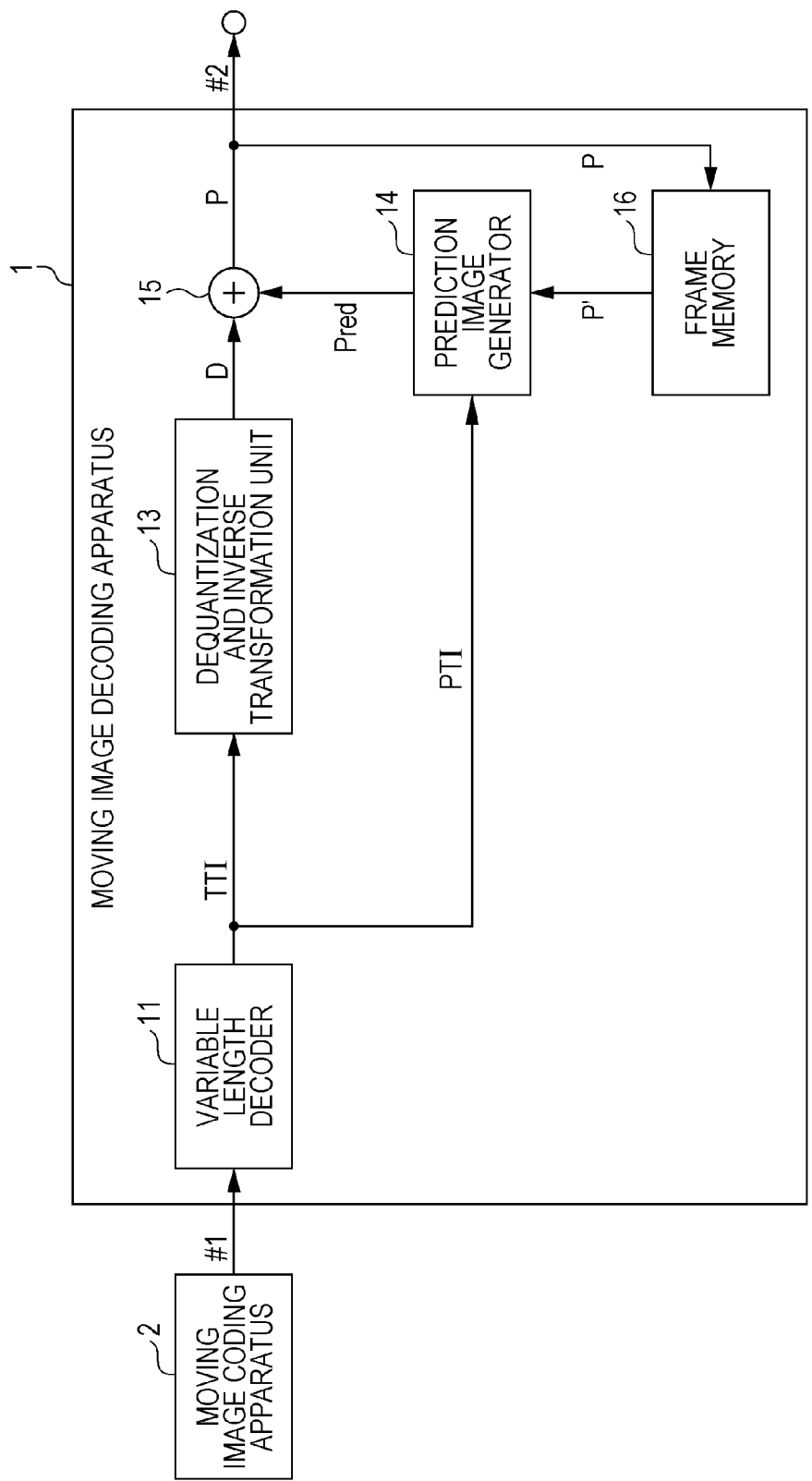
FIG. 2 is a functional block diagram diagrammatically illustrating the moving image decoding apparatus.

Referring to FIG. 1, the configuration of the prediction direction deriver 1453 is specifically described below. FIG. 1 is a functional block diagram of the configuration example of the prediction direction deriver 1453. As illustrated in FIG. 1, the prediction direction deriver 1453 includes a main direction deriving unit 1453A and a gradient deriving unit 1453B.

The main direction deriving unit 1453A derives the main direction flag bRefVer. The main direction deriving unit 1453A may reference the prediction mode definition DEFPM1 of FIG. 6. The main direction flag bRefVer may be derived with reference to the main direction corresponding to the prediction mode number m.

The gradient deriving unit 1453B derives the gradient intraPredAngle. The gradient deriving unit 1453B may reference a gradient definition table DEFANG1 of FIG. 13. The gradient definition table DEFANG1 of FIG. 13 indicates the association relationship between the value of a direction mode identifier and the value of a gradient intraPredAngle. The gradient deriving unit 1453B may derive the gradient intraPredAngle based on the gradient definition table DEFANG1. The value of the gradient intraPredAngle represents the value of a gradient of the prediction direction. More precisely, the direction of a vector represented by (intraPredAngle, −32) is the prediction direction in a case that the main direction is a vertical direction. The direction of a vector represented by (−32, intraPredAngle) is the prediction direction in a case that the main direction is a horizontal direction. In the gradient definition table DEFANG1 of FIG. 13, the absolute values of the gradients intraPredAngle corresponding to the absolute values of deviations 0 through 8 with respect to the main direction are 0, 2, 5, 9, 13, 17, 21, 26, and 32 in order in the luma domain. The sign of a deviation with respect to the main direction is equal to the sign of the gradient intraPredAngle. For example, the value of the gradient intraPredAngle corresponding to the identifier HOR−1 is −2 in the luma domain.

The gradient deriving unit 1453B may reference a chroma gradient definition table DEFANG1C of FIG. 16 in a case that the prediction image generation target is a chroma pixel. The process of the gradient deriving unit 1453B with the prediction image generation target being the chroma pixel is described below.

The angular predicting unit 1452A generates a prediction image corresponding to the target PU using the reference pixel in the input prediction direction (reference direction), and outputs the prediction image. In the generation process of the prediction image through the angular prediction, a main reference pixel is configured in response to the main direction flag bRefVer and the prediction image is generated by referencing the main reference pixel in the PU by line or by column as a unit. In a case that the value of the main direction flag bRefVer is 1 (the main direction is a vertical direction), the generation unit of the prediction image is configured to be line and the reference pixel in the upper portion of the target PU is configured to be a main reference pixel. More specifically, a main reference pixel refMain[x] is configured using the value of the reference pixel p[x,y] in accordance with the following formulas.

$refMain[x]=p[−1+x,−1]$, with $x=0 \ldots 2*nS$ $refMain[x]=p[−1,−1+((x*invAngle+128)>>8)]$, with $x=−nS \ldots −1$ where invAngle corresponds to a value into which the reciprocal of the deviation intraPredAngle of the prediction direction is scaled (multiplied by 8192). In the above formulas, within a range of x equal to or above 0, decoded pixel values of pixels adjacent along the top side of the target PU are configured as the values of refMain[x]. Within a range of x below 0, decoded pixel values of pixels adjacent along the left side of the target PU are configured as the values of refMain[x] at locations derived in accordance with the prediction direction. The prediction image predSamples[x,y] is calculated in accordance with the following formula.

$predSamples[x,y]=((32−iFact)*refMain[x+iIdx+1]+iFact*refMain[x+iIdx+2]+16)>>5$ where iIdx and iFact represent the locations of the main reference pixels for use in the generation of the prediction target pixel that is calculated in accordance with the distance (y+1) between the prediction target line and the main reference pixel, and the gradient intraPredAngle. iIdx represents the location of integer precision in the pixel unit, and iFact represents the location of fraction precision in the pixel unit, and these are derived in accordance with the following formulas.

$iIdx=((y+1)*intraPredAngle)>>5$ $iFact=((y+1)*intraPredAngle)\&\&31$

In a case that the value of the main direction flag bRefVer is 0 (the main direction is a horizontal direction), the generation unit of the prediction image is configured to be in the column and the reference pixel along the left side of the target PU is set to be the main reference pixel. More specifically, the main reference pixel refMain[x] is configured using the value of the reference pixel p[x,y] in accordance with the following formulas.

$refMain[x]=p[−1,−1+x]$, with $x=0 \ldots nS$ $refMain[x]=p[−1+((x*invAngle+128)>>8),−1]$, with $x=−nS \ldots −1$ The prediction image predSamples[x,y] is calculated in accordance with the following formula.

$predSamples[x,y]=((32−iFact)*refMain[y+iIdx+1]+iFact*refMain[y+iIdx+2]+16)>>5$ where iIdx and iFact represent the locations of the main reference pixels for use in the generation of the prediction target pixel that is calculated in accordance with the prediction target column and the distance to the main reference pixel (x+1), and the gradient intraPredAngle. iIdx represents the location of integer precision in the pixel unit, and iFact represents the location of fractional point precision in the pixel unit, and these are derived in accordance with the following formulas.

$iIdx=((x+1)*intraPredAngle)>>5$ $iFact=((x+1)*intraPredAngle)\&31$ where '&' represents an operator indicating a logical product of bit calculation, and the result of "A&31" means the remainder of the integer A divided by 32.

Flow of Angular Prediction Process

Figure 14:
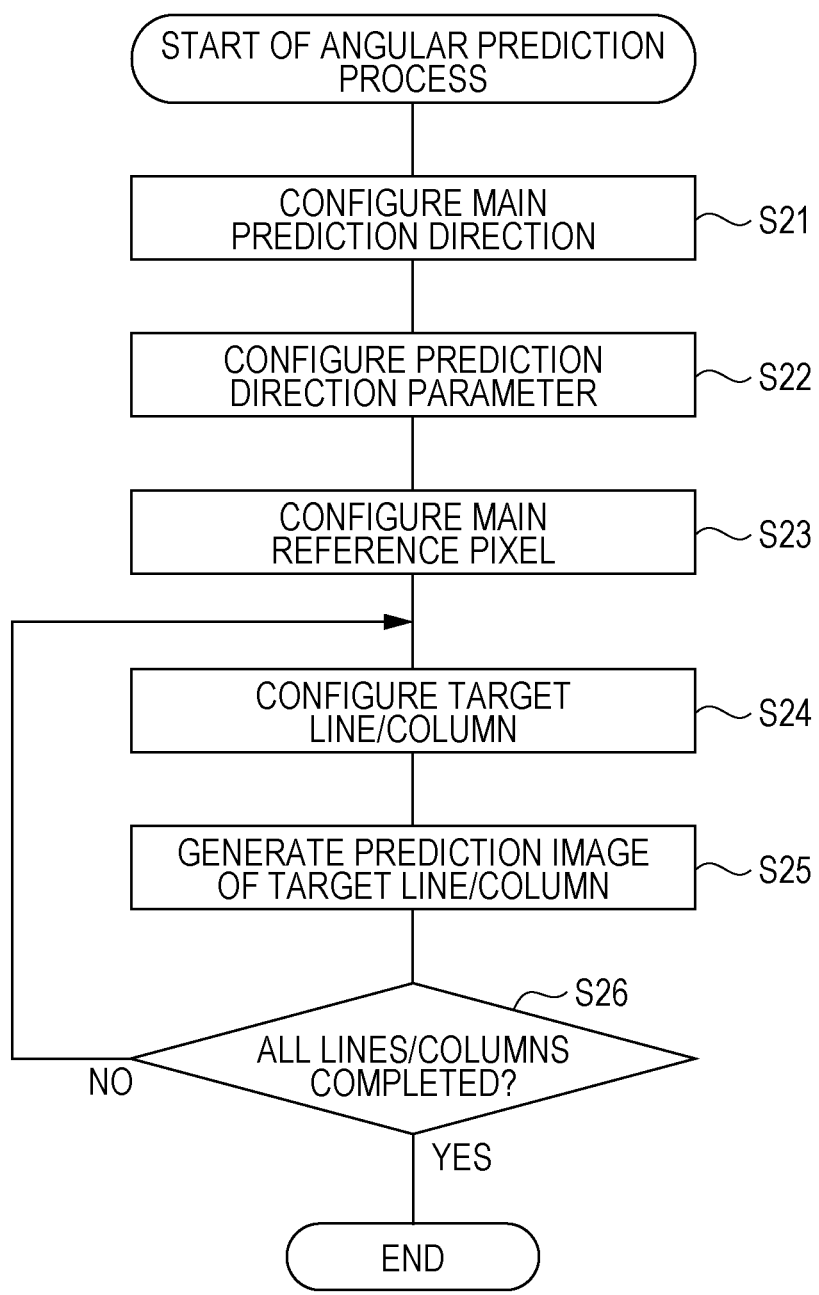
FIG. 14 is a flowchart illustrating an angular prediction process of the luma prediction unit.

The prediction image generation process of the luma prediction unit 145 with the prediction mode being the angular prediction is described with reference to a flowchart of FIG. 14. FIG. 14 is a flowchart illustrating the angular prediction process of the luma prediction unit. The prediction image generation process in the angular prediction starts in a case that the prediction mode input to the prediction method selector 1451 is the angular prediction. The prediction direction deriver 1453 determines the main direction of the prediction direction based on the input prediction mode and outputs the main direction to the angular predicting unit 1452A (S21). The prediction direction deriver 1453 determines an offset intraPredAngle of the prediction direction with respect to the main direction based on the input prediction mode, and outputs the offset intraPredAngle to the angular predicting unit 1452A (S22). In response to the input main direction, the angular predicting unit 1452A configures the main reference pixel (S23). The angular predicting unit 1452A configures a prediction target line or a prediction target column (S24), and generates a prediction image with respect to the target line or the target column (S25). The angular predicting unit 1452A determines whether the generation of the prediction images of all lines or all columns of the target PU is complete (S26). If the generation of the prediction images is not complete (NO branch from S26), processing returns to S24. If the generation of the prediction images is complete (YES branch from S26), the angular predicting unit 1452A outputs the prediction image of the target PU and completes the process.

Detail of Chroma Prediction Unit

Figure 15:
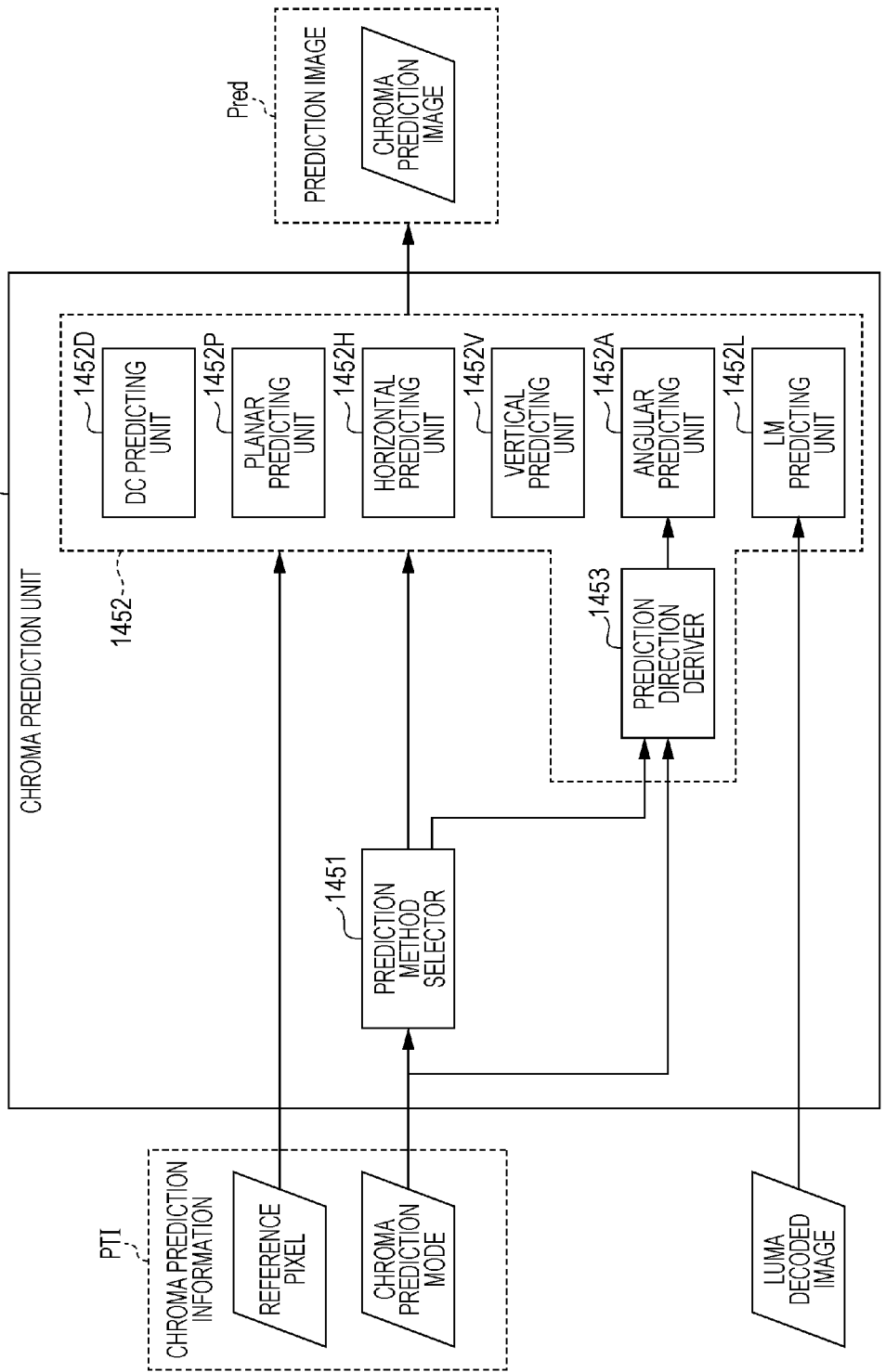
FIG. 15 is a block diagram illustrating a detailed configuration of a chroma prediction unit included in the prediction image generator.

Referring to FIG. 15, the chroma prediction unit 146 is described in detail. FIG. 15 is a block diagram illustrating the detailed configuration of the chroma prediction unit 146. The chroma prediction unit 146 includes a prediction method selector 1451, a prediction image deriver 1452, and a prediction direction deriver 1453. The prediction image deriver 1452 includes the DC predicting unit 1452D, the planar predicting unit 1452P, the horizontal predicting unit 1452H, the vertical predicting unit 1452V, the angular predicting unit 1452A, and an LM predicting unit 1452L. The elements other than the LM predicting unit 1452L have the same functions as those of the corresponding elements included in the luma prediction unit 145 and are designated with the same reference numerals and the discussion thereof is omitted herein. However, the gradient deriving unit 1453B included in the prediction direction deriver 1453 performs an operation on the chroma image different from the operation performed on the luma image, and is thus described herein.

The gradient deriving unit 1453B uses a chroma gradient definition table DEFANG1C of FIG. 16 as a gradient definition table in a case that the prediction image generation target is a chroma pixel. In the gradient definition table DEFANG1C of FIG. 16, the absolute values of the gradients intraPredAngle corresponding to the absolute values of deviations 0 through 8 with respect to the main direction are 0, 1, 2, 4, 6, 8, 10, 13, and 16 in order in a case that the main direction is a vertical direction, and are 0, 4, 10, 18, 26, 34, 42, 52, and 64 in order in a case that the main direction is a horizontal direction. In a case that the main direction is a vertical direction, the value of each intraPredAngle of the IntraPredMode in the gradient definition table DEFANG1C of FIG. 16 is half the value of the corresponding intraPredAngle of the same IntraPredMode in the gradient definition table DEFANG1 of FIG. 13 (fraction rounded off). In a case that the main direction is a horizontal direction, the value of each intraPredAngle of the IntraPredMode in the gradient definition table DEFANG1C of FIG. 16 is twice the value of the corresponding intraPredAngle of the same IntraPredMode in the gradient definition table DEFANG1 of FIG. 13.

The gradient deriving unit 1453B may reference only the gradient definition table DEFANG1 of FIG. 13, and in a case that the chroma pixel is a prediction image generation target, the gradient deriving unit 1453B uses as intraPredAngle a value that results from dividing by 2 a value from the gradient definition table DEFANG1 of FIG. 15 in a case of a vertical direction as the main direction, and uses as intraPredAngle a value that results from multiplying by 2 a value from the gradient definition table DEFANG1 of FIG. 13 in a case of a horizontal direction as the main direction. The gradient deriving unit 1453B may thus perform the same process. The definition and the selective reference of the chroma gradient definition table DEFANG1C of FIG. 16 are not needed, and memory saving is performed.

The relationship between the value of the gradient intraPredAngle of luma and the value of the gradient intraPredAngle of chroma in an image of the 4:2:2 format depends on the relationship expressed by vxL=2vxC and vyL=vyC between a vector (vxL,vyL) in the luma space and a vector (vxC,vyC) in the chroma space. The gradient of the vector (vxC,vyC) with respect to the horizontal direction in the chroma space is (vyC/vxC)=2(vyL/vxL), and is twice the gradient of the vector with respect to the horizontal direction in the luma space. The gradient of the vector (vxC,vyC) with respect to the vertical direction in the chroma space is (vxC/vyC)=0.5(vxL/vyL), and is half the gradient of the vector with respect to the vertical direction in the luma space. Generally, if the relationship in the input image between the vector (vxL,vyL) in the luma space and the vector (vxC,vyC) in the chroma space is vxL=α·vxC and vyL=β·vyC, the value of the gradient intraPredAngle of chroma is preferably (α/β) times the value of the gradient intraPredAngle of luma in a case that the main direction is a horizontal direction, and preferably (β/α) times the value of the gradient intraPredAngle of luma in a case that the main direction is a vertical direction.

The LM predicting unit 1452L estimates a parameter related to a correlation between a luma pixel value and a chroma pixel value in the target PU based on a correlation between a luma decoded pixel value and a reference pixel value (chroma decoded pixel value) surrounding the target PU. The correlation parameter includes a correlation coefficient a and an offset b. The prediction target PU, namely, the chroma prediction image predSamplesC[xC,yC] is calculated using a pixel value recY[xL,yL] of a luma decoded image corresponding to the target PU and the correlation parameter in accordance with the following formula.

predSamplesC[xC,yC]=a*recY[xL,yL]+b where xC and yC are coordinates of a chroma pixel unit, and xL and yL are coordinates of a luma pixel unit indicative of locations respectively corresponding to xC and yC. For example, xL=2*xC and yL=yC hold in a case of the 4:2:2 YUV format.

The prediction image generation process of the target CU performed by the prediction image generator 14 has been described.

Detail of Variable Length Decoder

Figure 17:
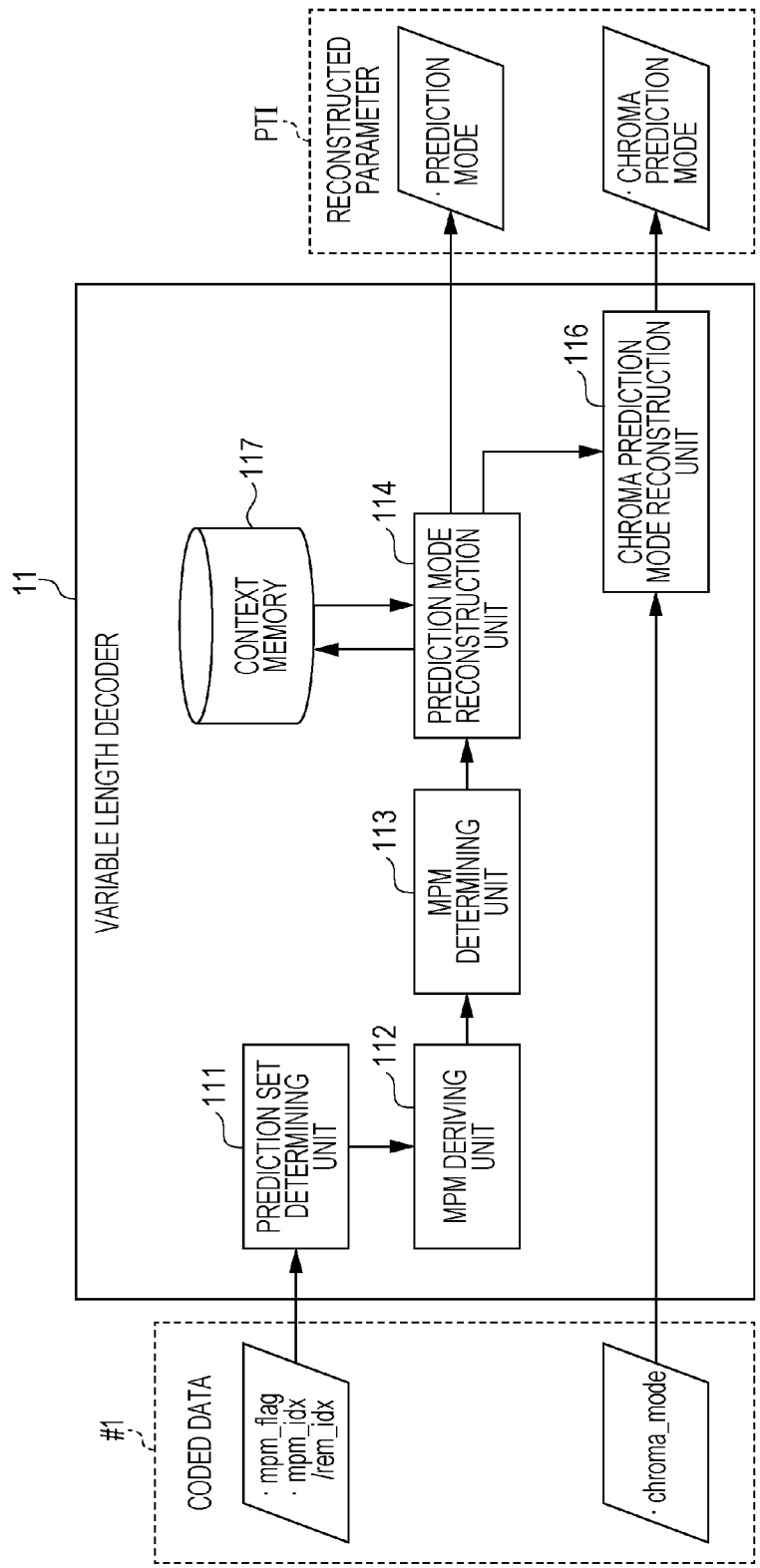
FIG. 17 is a functional block diagram illustrating a configuration example of a variable length decoder in the moving image decoding apparatus.

The configuration of the variable length decoder 11 is described further in detail with reference to FIG. 17. FIG. 17 is a functional block diagram illustrating the configuration example of the variable length decoder 11. FIG. 17 illustrates in detail a portion of the variable length decoder 11 that is responsible for decoding the prediction mode.

As illustrated in FIG. 17, the variable length decoder 11 includes a prediction set determining unit 111, an MPM deriving unit 112, an MPM determining unit 113, a prediction mode reconstruction unit 114, a chroma prediction mode reconstruction unit 116, and a context memory 117.

The prediction set determining unit 111 determines a prediction set as a set of prediction modes for use in the prediction process. For example, the prediction set determining unit 111 calculates the number of prediction modes for use in the prediction process based on the size of the target block, selects prediction modes of the calculated number according to the definition of the prediction mode, and thus determines the prediction set. In other words, the prediction set is defined based on the size of the target block, or based on the number of prediction modes usable on the target PU.

The MPM deriving unit 112 derives an MPM based on the prediction mode assigned to a partition surrounding the target partition.

The MPM deriving unit 112 derives two MPMs, for example. The MPM deriving unit 112 derives a first MPM candidate (hereinafter designated MPM0) and a second MPM candidate (hereinafter designated MPM1) as described below.

Figures 18, 19:
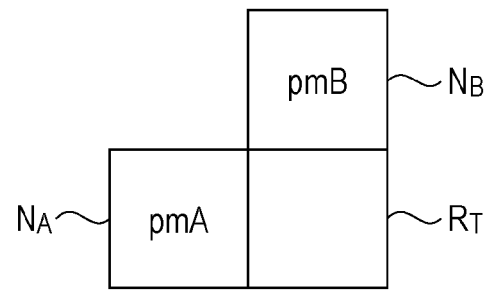
FIG. 18 illustrates a deriving method of an MPM deriving unit in the variable length decoder to derive an MPM candidate.
FIG. 19 illustrates a table that defines the association relationship among an intra chroma prediction mode specifying information chroma_mode, a prediction mode of luma (IntraPredMode[xB][yB]), and a chroma prediction mode (IntraPredModeC).

Referring to FIG. 18, the MPM deriving unit 112 configures pmA for a prediction mode $N_A$ at a target PU, namely, an adjacent PU to the left of $R_T$, and configures pmB for a prediction mode $N_B$ at a target PU, namely, an adjacent PU on top of $R_T$. If the prediction mode on the left PU or on the upper PU is not usable, the MPM deriving unit 112 configures an existing prediction mode, such as "Intra_Planar" to be used. The cases that the adjacent PU is not usable include a case that the prediction mode of the adjacent PU is not decoded, and a case that the adjacent PU is an upper adjacent PU that belongs to a different LCU (tree block).

The MPM deriving unit 112 derives MPM0 in accordance with the following formula (1).

$$MPM0=pmA \quad (1)$$

The MPM deriving unit 112 then derives MPM1 depending on whether pmA matches pmB. If pmA and pmB fail to match each other, MPM1 is derived in accordance with the following formula (2).

$$MPM1=pmB \quad (2)$$

If pmA matches pmB on the other hand, the MPM deriving unit 112 configures MPM1 for "Intra_Planar" in a case of pmA being "Intra_DC" and configures MPM1 for "Intra_DC" in a case of pmA being other than "Intra_DC".

In response to mpm_flag included in the coded data, the MPM determining unit 113 determines whether the prediction mode of the target PU matches an estimation prediction mode MPM. If the prediction mode of the target PU matches the estimation prediction mode MPM, mpm_flag is "1", and if the prediction mode of the target PU fails to match the estimation prediction mode MPM, mpm_flag is "0". The MPM determining unit 113 notifies the prediction mode reconstruction unit 114 of the determination result.

The MPM determining unit 113 decodes mpm_flag from the coded data in accordance with context stored on the context memory 117.

The prediction mode reconstruction unit 114 decodes the prediction mode of the target PU. The prediction mode reconstruction unit 114 decodes the prediction mode in response to the determination result notified by the MPM determining unit 113.

If the prediction mode of the target PU matches the estimation prediction mode MPM, the prediction mode reconstruction unit 114 decodes mpm_idx from the coded data, and reconstructs the prediction mode based on the value of mpm_idx. If the prediction mode of the target PU matches MPM0, mpm_idx is "0", and if the prediction mode of the target PU matches MPM1, mpm_idx is "1".

If the prediction mode of the target PU fails to match the estimation prediction mode MPM, the prediction mode reconstruction unit 114 reconstructs the prediction mode based on rem_idx included in the coded data. More specifically, the prediction mode reconstruction unit 114 swaps a value of MPM0 with a value of MPM1 on condition that a smaller prediction mode number is assigned to MPM0. If the value of rem_idx is equal to or above the value of MPM0, the prediction mode reconstruction unit 114 adds 1 to the value of rem_idx. If the value of rem_idx is equal to or above the value MPM1, the prediction mode reconstruction unit 114 adds 1 to the value of rem_idx. Finally, the prediction mode reconstruction unit 114 reconstructs the prediction mode corresponding to the prediction mode number equal to the value of rem_idx.

The chroma prediction mode reconstruction unit 116 reconstructs the chroma prediction mode of the target PU. More in detail, the chroma prediction mode reconstruction unit 116 reconstructs the chroma prediction mode as described below.

The chroma prediction mode reconstruction unit 116 first decodes intra chroma prediction mode specifying information chroma_mode (intra_chroma_pred_mode) included in the coded data #1. The chroma prediction mode reconstruction unit 116 reconstructs the chroma prediction mode based on the reconstructed intra chroma prediction mode specifying information chroma_mode and luma prediction mode (IntraPredMode[xB][yB]. This operation is described more in detail below.

FIG. 19 is a table associating the intra chroma prediction mode specifying information chroma_mode (intra_chroma_pred_mode) and the luma prediction mode (IntraPredMode[xB][yB] with the chroma prediction mode (IntraPredModeC). In the table, "LM" indicates that the LM mode described above is used. "X" indicates that the value of the luma prediction mode (IntraPredMode[xB][yB]) is used as is. The prediction mode corresponding to "X" is referred to as DM mode.

General Flow of Process

Figure 20:
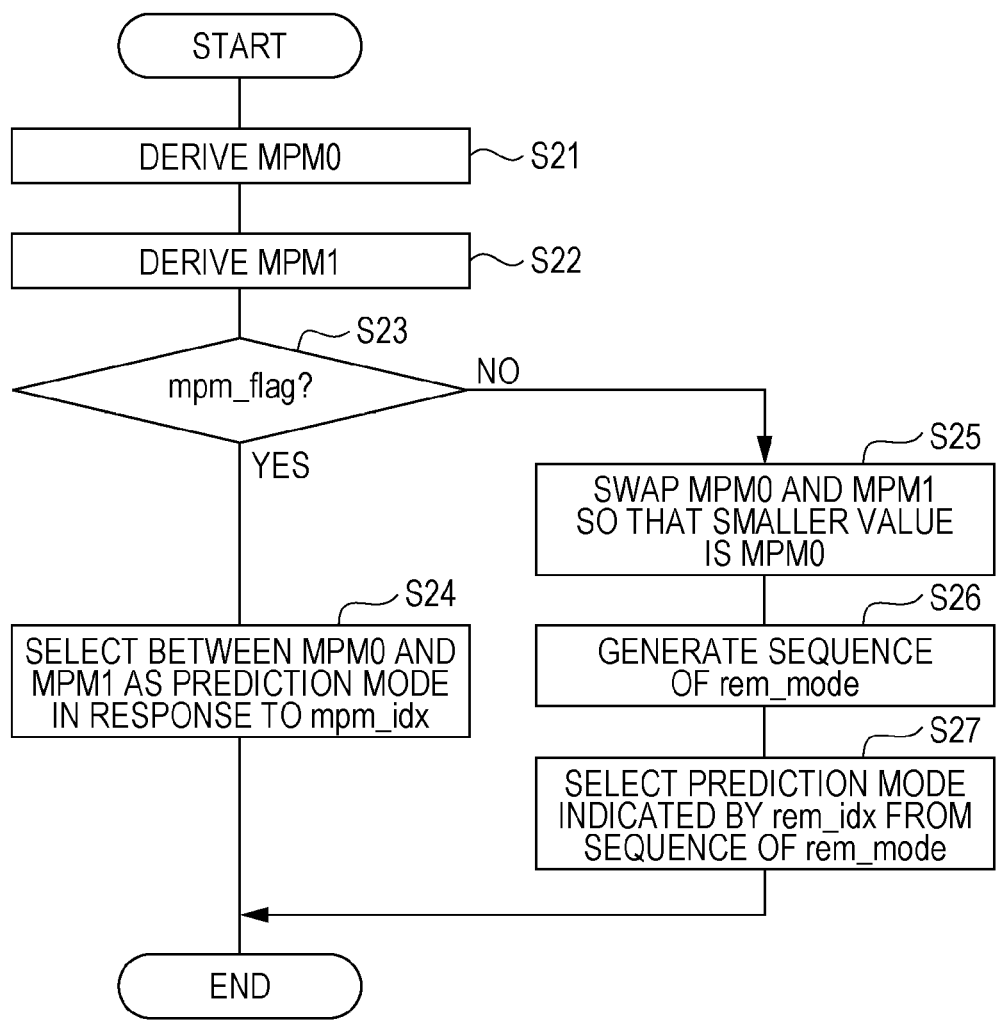
FIG. 20 is a flowchart illustrating a general flow example of a prediction mode reconstruction process of the moving image decoding apparatus.

A general flow of a prediction mode reconstruction process of the moving image decoding apparatus 1 is described with reference to a flowchart of FIG. 20.

At the start of the prediction mode reconstruction process by the moving image decoding apparatus 1, the MPM deriving unit 112 derives MPM0 (S21). The MPM deriving unit 112 then derives MPM1 (S22).

In response to mpm_flag, the MPM determining unit 113 determines whether the prediction mode of the target PU matches the estimation prediction mode MPM (S23).

If the prediction mode of the target PU matches the estimation prediction mode MPM, namely, MPM0 or MPM1 (YES branch from S23), the prediction mode reconstruction unit 114 reconstructs the prediction mode in accordance with mpm_idx. If mpm_idx is "0", the prediction mode reconstruction unit 114 selects MPM0 for the prediction mode pmT of the target PU, and if mpm_idx is "1", the prediction mode reconstruction unit 114 selects MPM1 for the prediction mode pmT of the target PU (S24).

If the prediction mode of the target PU fails to match the estimation prediction mode MPM (NO branch from S23), the prediction mode reconstruction unit 114 compares MPM0 with MPM1. If the prediction mode number of MPM1 is smaller than the prediction mode number of MPM0, the prediction mode reconstruction unit 114 swaps MPM0 with MPM1 (S25). The prediction mode reconstruction unit 114 generates a sequence of rem_mode (S26).

Finally, the prediction mode reconstruction unit 114 selects as a prediction mode a rem_idx-th element of the rem_mode sequence (S27).

Moving Image Coding Apparatus

Figure 21:
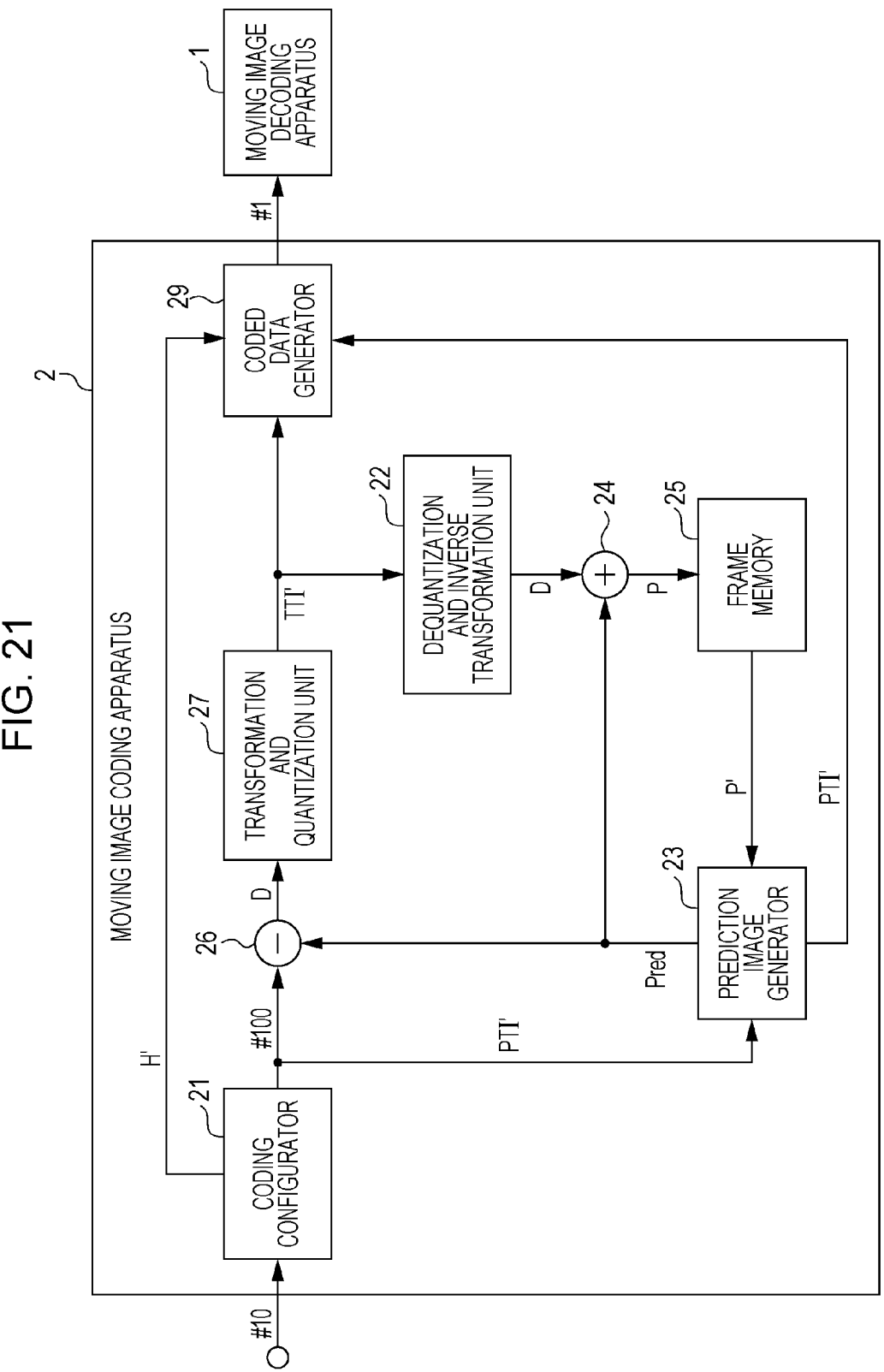
FIG. 21 is a functional block diagram illustrating a configuration of the moving image coding apparatus of an embodiment of the present invention.

The moving image coding apparatus 2 of the present embodiment is described with reference to FIG. 21 through FIG. 23.

Summary of Moving Image Coding Apparatus

In summary, the moving image coding apparatus 2 is an apparatus that generates coded data #1 by coding an input image #10, and outputs the coded data #1.

Configuration of Moving Image Coding Apparatus

The configuration of the moving image coding apparatus 2 is first described with reference to FIG. 21. FIG. 21 is a functional block diagram illustrating the configuration of the moving image coding apparatus 2. As illustrated in FIG. 21, the moving image coding apparatus 2 includes a coding configurator 21, a dequantization and inverse transformation unit 22, a prediction image generator 23, an adder 24, a frame memory 25, a subtractor 26, a transformation and quantization unit 27, and a coded data generator 29.

The coding configurator 21 generates image data related to coding and a variety of configuration information based on the input image #10.

More specifically, the coding configurator 21 generates next image data and configuration information.

The coding configurator 21 successively splits the input image #10 by slice unit, tree block unit, or CU unit, thereby generating a CU image #100 of the target CU.

The coding configurator 21 generates header information H' based on the splits results. The header information H' includes (1) information related to the size and shape of a tree block belonging to the target slice and the location of the tree block within the target slice, and (2) CU information CU' related to the size of a CU belonging to each tree block and the location of the CU within the target tree block.

The coding configurator 21 references a CU image #100 and the CU information CU' to generate the PT configuration information PTI'. The PT configuration information PTI' includes information related to all combinations of (1) split patterns of the target CU to PUs, and (2) prediction modes assigned to the PUs.

The coding configurator 21 supplies the CU image #100 to the subtractor 26. The coding configurator 21 supplies the header information H' to the coded data generator 29. The coding configurator 21 supplies the PT configuration information PTI' to the prediction image generator 23.

The dequantization and inverse transformation unit 22 reconstructs a prediction residue of each block by dequantizing and inverse orthogonal transforming a quantization prediction residue of each block supplied by the transformation and quantization unit 27. The inverse orthogonal transformation has been described with reference to the dequantization and inverse transformation unit 13 of FIG. 1, and the discussion thereof is omitted herein.

The dequantization and inverse transformation unit 22 integrates the prediction residues of the blocks in accordance with the split pattern specified by TT split information (to be discussed later) to generate the prediction residue D of the target CU. The dequantization and inverse transformation unit 22 then supplies the generated prediction residue D of the target CU to the adder 24.

The prediction image generator 23 references a locally decoded image P' stored on the frame memory 25 and the PT configuration information PTI' to generate the prediction image Pred of the target CU. The prediction image generator 23 configures the prediction parameter obtained through the prediction image generation process as the PT configuration information PTI' and transfers the PT configuration information PTI' to the coded data generator 29. The prediction image generation process performed by the prediction image generator 23 is the same process as that of the prediction image generator 14 included in the moving image decoding apparatus 1, and the discussion thereof is omitted herein.

The adder 24 sums the prediction image Pred supplied from the prediction image generator 23 and the prediction residue D supplied from the dequantization and inverse transformation unit 22, thereby generating a decoded image P of the target CU.

The decoded images P are successively stored on the frame memory 25. At the decoding of the target tree block, the frame memory 25 stores the decoded images of all tree blocks decoded prior to the target tree block (namely, all the tree blocks in the raster scan order prior to the target tree block).

The subtractor 26 generates the prediction residue D of the target CU by subtracting the prediction image Pred from the CU image #100. The subtractor 26 transfers the generated prediction residue D to the transformation and quantization unit 27.

The transformation and quantization unit 27 generates a quantization prediction residue by performing the orthogonal transformation and quantization on the prediction residue D. The orthogonal transformation refers to a transformation from the pixel domain to the frequency domain. Examples of inverse orthogonal transformation include DCT transform (discrete cosine transform), and DST transform (discrete sine transform).

More specifically, the transformation and quantization unit 27 references the CU image #100 and the CU information CU' and determines one or more splits patterns of the target CU. The transformation and quantization unit 27 splits the prediction residue D into prediction residues of the blocks in accordance with the determined split pattern.

The transformation and quantization unit 27 generates the prediction residue in the frequency domain by orthogonally transforming the prediction residue of each block. The transformation and quantization unit 27 then generates a quantization prediction residue of each block by quantizing the prediction residue in the frequency domain.

The transformation and quantization unit 27 generates the TT configuration information TTI' including the generated quantization prediction residue of each block, TT split information specifying the split pattern of the target CU, and information related to all the split patterns in accordance with which the target CU is split into the blocks. The transformation and quantization unit 27 supplies the generated TT configuration information TTI' to the dequantization and inverse transformation unit 22 and the coded data generator 29.

The coded data generator 29 codes the header information H', the TT configuration information TTI', and the PT configuration information PTI', and multiplexes the coded header information H, TT information TTI and PT information PTI to generate the coded data #1. The coded data generator 29 then outputs the coded data #1.

Detail of Coded Data Generator

The coded data generator 29 is described in detail with reference to FIG. 22. FIG. 22 is a functional block diagram illustrating the configuration example of the coded data generator 29.

The coded data generator 29 described below codes parameters related to the prediction mode (luma) and the chroma prediction mode out of the parameters included in the TT configuration information TTI'.

The data coded by the coded data generator 29 is not limited to the codes described above. The coded data generator 29 may further code data, such as side information, in addition to the transform coefficient included in the TT configuration information TTI'.

Figure 22:
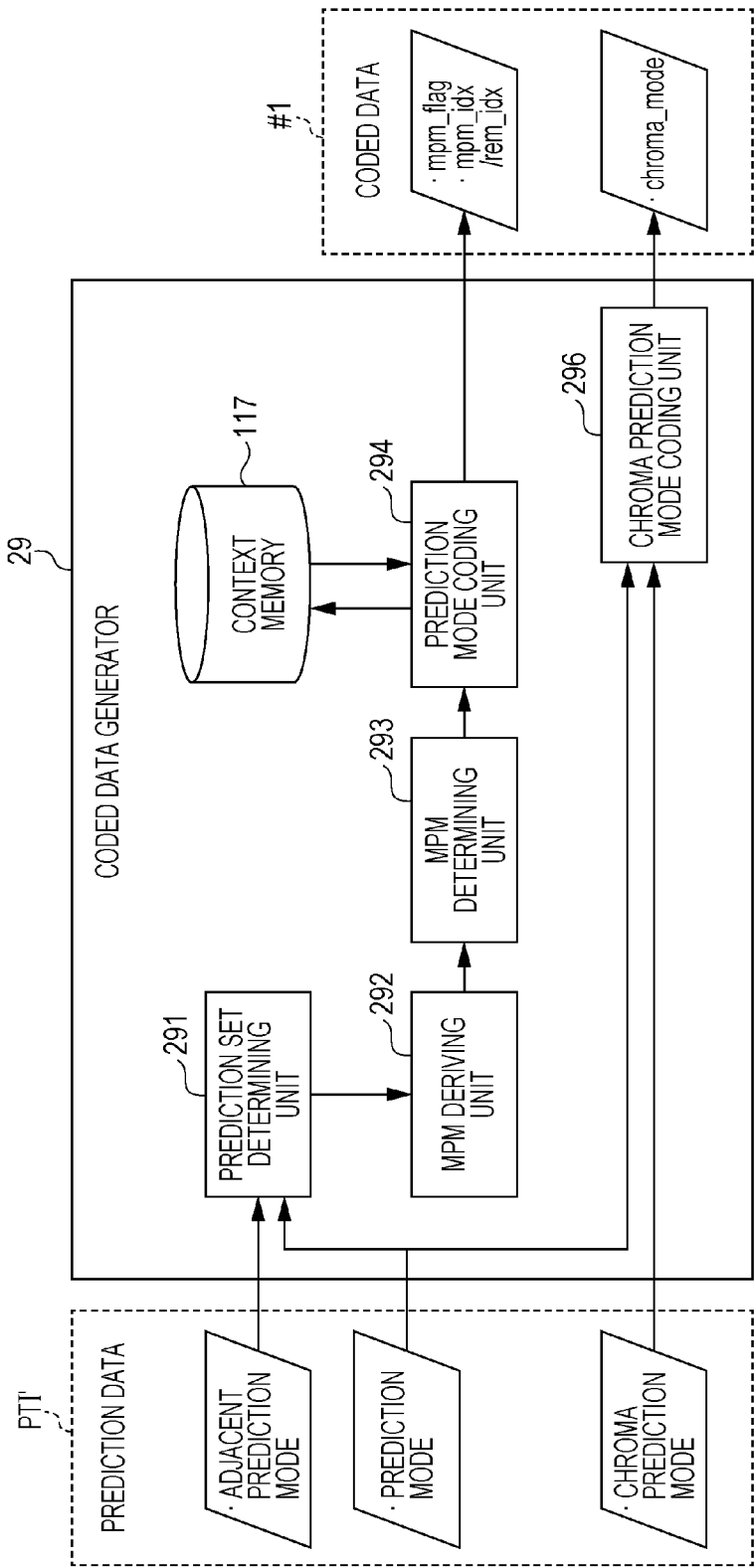
FIG. 22 is a functional block diagram illustrating a configuration example of a coded data generator in the moving image coding apparatus.

Referring to FIG. 22, the coded data generator 29 includes a context memory 117, a prediction unit determining unit 291, an MPM deriving unit 292, an MPM determining unit 293, a prediction mode coding unit 294, and a chroma prediction mode coding unit 296.

The moving image decoding apparatus 1 and the moving image coding apparatus 2 are identical in operation in terms of the derivation of the MPM.

If a configuration or a process is common to the moving image decoding apparatus 1 and the moving image coding apparatus 2 in this way, the same configuration or the same process used in the moving image decoding apparatus 1 may also be used in the moving image coding apparatus 2.

The prediction unit determining unit 291 and the MPM deriving unit 292 are respectively identical to the context memory 151, and the chroma prediction mode definition memory 154, and the prediction set determining unit 111, and the MPM deriving unit 112 illustrated in FIG. 1. The discussion of these elements are omitted herein.

The MPM determining unit 293, the prediction mode coding unit 294, and the chroma prediction mode coding unit 296 are described below.

The MPM determining unit 293 determines whether the MPM matches the prediction mode, and codes mpm_flag depending on the determination results. The coding process has been discussed with reference to the variable length decoder 11 of FIG. 1, and thus the discussion thereof is omitted herein.

The prediction mode coding unit 294 codes information related to the prediction mode (mpm_idx and rem_idx) in response to the determination results of the MPM determining unit 293. If the MPM is used, the prediction mode coding unit 294 codes mpm_idex, and if the MPM is not used, the prediction mode coding unit 294 codes rem_idx.

The coding of mpm_idx has been discussed with reference to the variable length decoder 11 of FIG. 1 and the discussion thereof is omitted herein.

The coding of rem_idx is described below.

The chroma prediction mode coding unit 296 codes the chroma prediction mode of the target PU. More in detail, the chroma prediction mode coding unit 296 codes the chroma prediction mode as described below.

The chroma prediction mode coding unit 296 acquires the value of the intra chroma prediction mode specifying information chroma_mode (intra_chroma_pred_mode) using the luma prediction mode and the chroma prediction mode.

The chroma prediction mode coding unit 296 codes the value of the acquired intra chroma prediction mode specifying information chroma_mode (intra_chroma_pred_mode).

The flow of the prediction mode coding process of the moving image coding apparatus 2 is described below with reference to FIG. 23.

Figure 23:
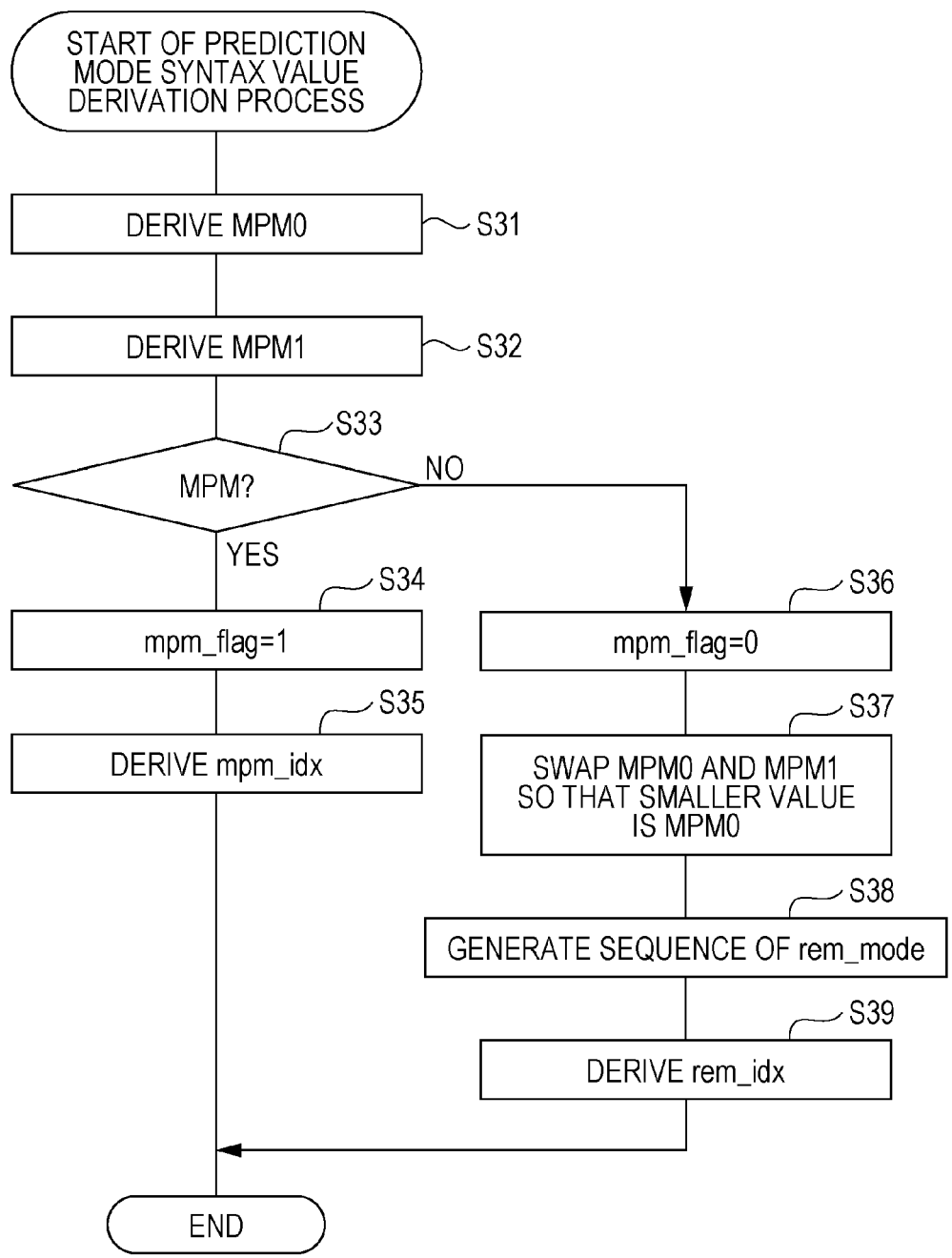
FIG. 23 is a flowchart illustrating a flow example of a prediction mode coding process of the moving image coding apparatus.

An example of the general flow of the prediction mode coding process of the moving image coding apparatus 2 is described referring to a flowchart of FIG. 23.

At the start of the prediction coding process on the moving image coding apparatus 2, the MPM deriving unit 292 derives MPM0 (S31). The MPM deriving unit 292 then derives MPM1 (S32).

The MPM determining unit 293 determines whether the prediction mode matches MPM (MPM0 or MPM1) (S33).

If the prediction mode matches MPM (YES branch from S33), the MPM determining unit 293 codes mpm_flag=1 (S34) and derives mpm_pdx on MPM0 or MPM1 whichever matches the prediction mode (S35).

If the prediction mode fails to match MPM (NO branch from S33), the MPM determining unit 293 codes mpm_flag=0 (S36). The prediction mode coding unit 294 compares MPM0 with MPM1, and swaps MPM0 with MPM1 if the prediction mode number of MPM1 is smaller than the prediction mode number of MPM0 (S37). The prediction mode coding unit 294 generates a sequence of rem_mode (S38). Finally, the prediction mode coding unit 294 derives rem_idx (S39).

Operation and Advantages

As described above, the moving image decoding apparatus 1 decodes image data of the 4:2:2 YUV format, and generates a prediction image through the intra prediction method corresponding to the prediction mode. The moving image decoding apparatus 1 includes the prediction direction deriver that derives the prediction direction of the chroma image by correcting the prediction direction of the luma image based on a difference in the pixel aspect ratio between the luma pixel and the chroma pixel in a case that the direction of the angular prediction in the luma prediction mode is reused in the chroma prediction mode.

As described above, the moving image coding apparatus 2 decodes the image data in the 4:2:2 YUV format, and generates the prediction image through the intra prediction method associated with the prediction mode. The moving image coding apparatus 2 includes the prediction direction deriver that derives the prediction direction of the chroma image by correcting the prediction direction of the luma image based on a difference in the pixel aspect ratio between the luma pixel and the chroma pixel in a case that the direction of the angular prediction in the luma prediction mode is reused in the chroma prediction mode.

The correction of the prediction direction in response to the difference in the pixel shape between the luma pixel and the chroma pixel reduces a difference in an angle that is caused in a case that the prediction direction of luma is applied as is to the prediction direction of chroma. A more accurate prediction image thus results.

Modifications

Modification 1: Correction of Prediction Direction During Prediction Image Generation The prediction direction may be corrected not by the prediction direction deriver 1453 in the moving image decoding apparatus 1 but by the angular predicting unit 1452A during the use of the DM mode, in other words, in a case that the luma prediction mode is reused as the chroma prediction mode. For example, the configuration of the prediction direction deriver 1453 of FIG. 1 may be modified as illustrated in FIG. 24, and the configuration of the chroma prediction unit 146 of FIG. 15 may be modified as illustrated in FIG. 25.

The prediction direction deriver 1453 and the chroma prediction unit 146 are described with reference to FIG. 24 and FIG. 25, respectively. The elements having the same function as those described previously are designated with the same reference numerals and the discussion thereof is omitted herein.

Figure 24:
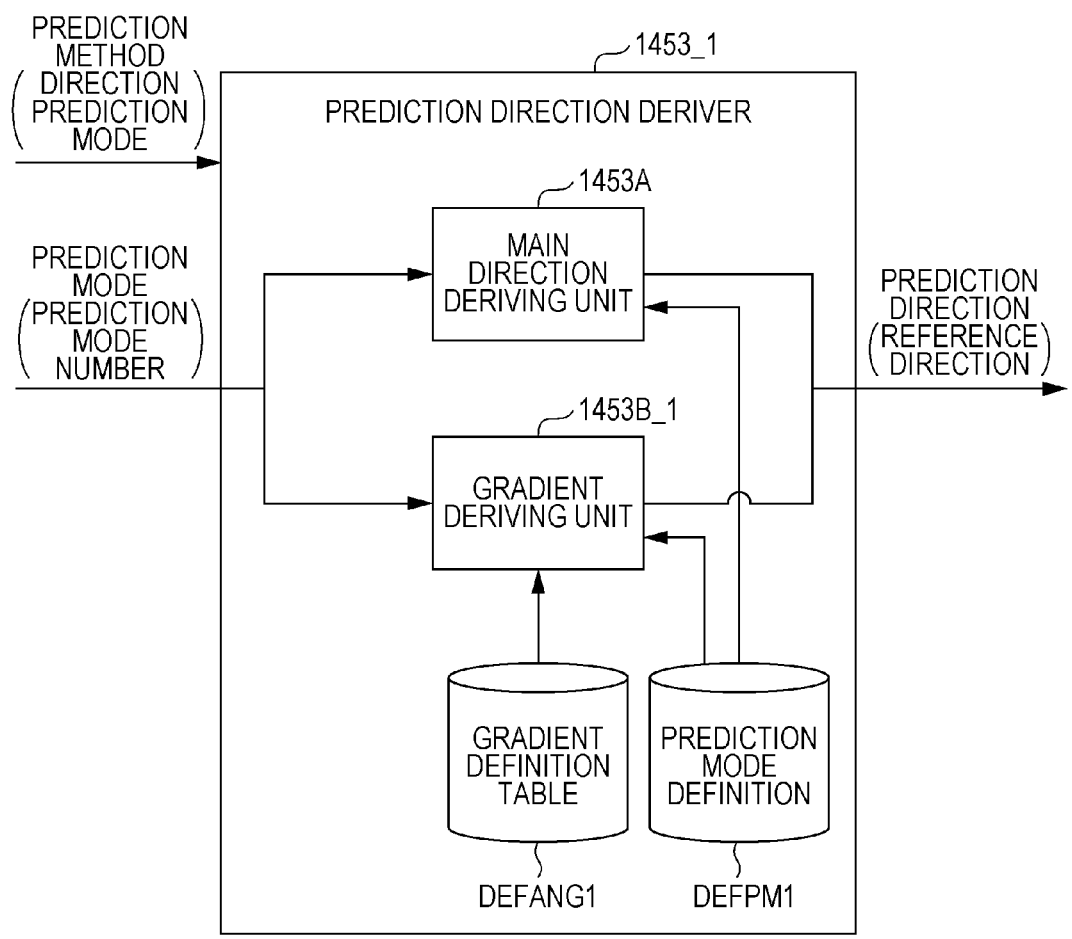
FIG. 24 illustrates a modification of a function block of a prediction direction deriver in the moving image decoding apparatus.

FIG. 24 illustrates a prediction direction deriver 1453_1 as a modification of the prediction direction deriver 1453 of FIG. 1. The prediction direction deriver 1453_1 includes the gradient deriving unit 1453B_1 in place of the gradient deriving unit 1453B in the prediction direction deriver 1453. The gradient deriving unit 1453B_1 uses the gradient definition table DEFANG1 of FIG. 13 regardless of whether the process target is in the luma domain or the chroma domain. Therefore, the prediction direction deriver 1453_1 does not correct the gradient.

Figure 25:
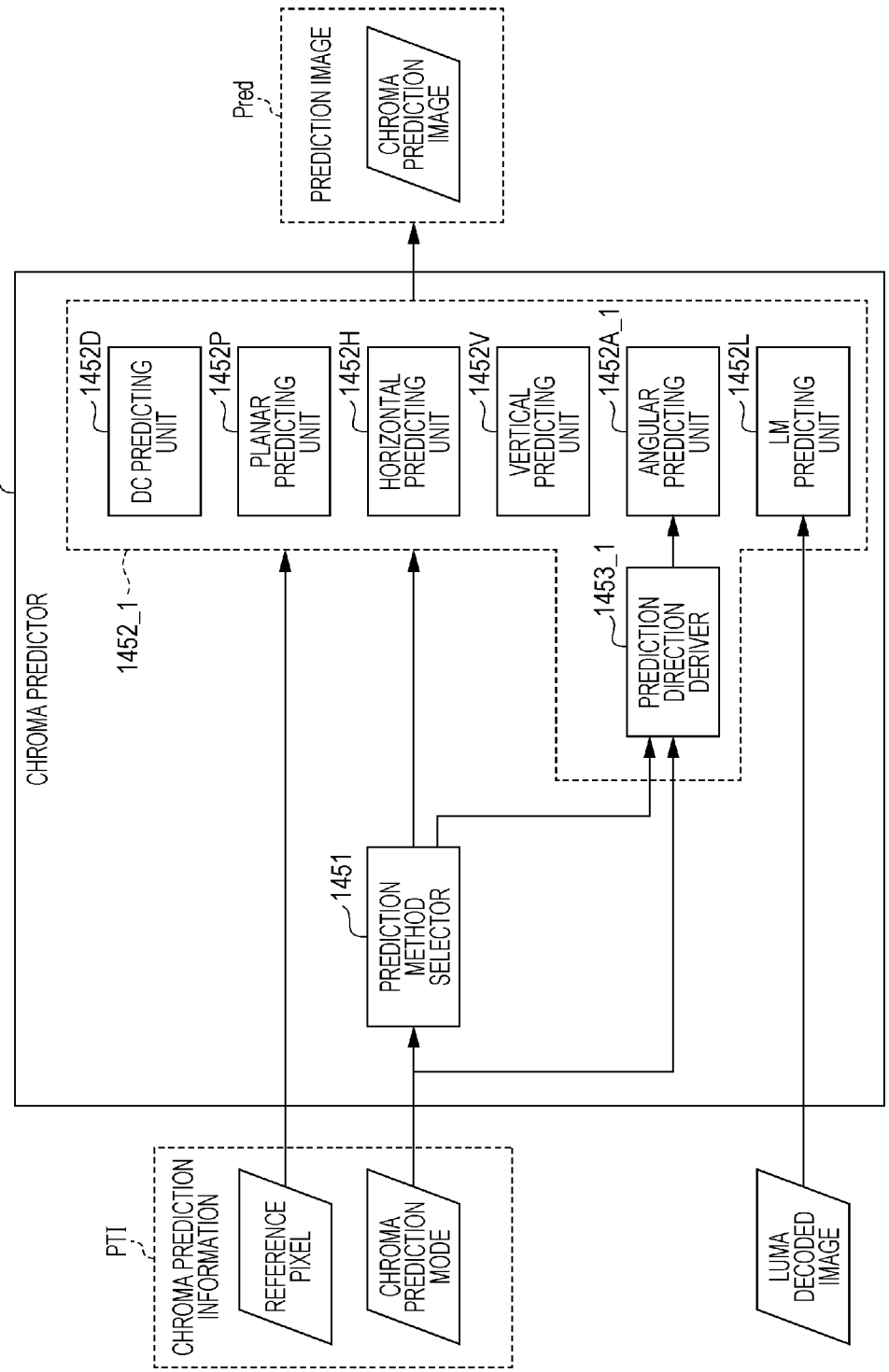
FIG. 25 is a block diagram illustrating a modification of a chroma prediction unit included in the prediction image generator.

FIG. 25 illustrates a chroma prediction unit 146_1 as a modification of the chroma prediction unit 146 of FIG. 15. The chroma prediction unit 146_1 includes a prediction direction deriver 1453_1 in place of the prediction direction deriver 1453 in the chroma prediction unit 146 and an angular predicting unit 1452A_1 in place of the angular predicting unit 1452A in the chroma prediction unit 146. The angular predicting unit 1452A_1 generates a chroma prediction image based on the same coordinate system as the luma image, and contracts the chroma prediction image by performing a decimation operation or a filtering operation on the chroma prediction image in accordance with the chroma coordinate system of the 4:2:2 YUV format. The contraction rate in this operation is determined based on the shape of the luma pixel or the shape of the chroma pixel.

More specifically, in the prediction image generation process, the angular predicting unit 1452A generates an intermediate image predSample'[x,y] that has in a horizontal direction the number of pixels twice the number of pixels needed for the chroma prediction image. Let nWc pixels and nHC pixels represent the width and height of a chroma prediction image of the target PU, and the size of the intermediate image predSamples' [x,y] is 2nWcXnHc. The generation method of the intermediate image predSamples' [x,y] is described more in detail below.

If the value of a main flag bRefVer is 1 (the main direction is a vertical direction), the main reference pixel refMain[x] is calculated in accordance with the following formulas.

$$\text{refMain}[2*x]=p[-1+x,-1], \text{with } x=0 \ldots 2*nWc$$

$$\text{refMain}[2*x]=p[-1,-1+((x*\text{invAngle}+128)>>8)], \text{with } x=-nWc \ldots -1$$

$$\text{refMain}[2*x+1]=(\text{refMain}[2*x]+\text{refMain}[2*x+2]+1)>>1, \text{with } x=-nWc \ldots 2*nWc-1$$

In this way, the main reference pixels refMain[x] twice the number of pixels in the horizontal direction are thus obtained.

If the value of the main direction flag bRefVer is 0 (the main direction is a horizontal direction), the modification of the formula is not needed. This is because luma and chroma have the same resolution in a case of a color format of 4:2:2. The main reference pixel refMain[x] is derived in accordance with the following formulas.

$$\text{refMain}[x]=p[-1+x,-1], \text{with } x=0 \ldots 2*nHc$$

$$\text{refMain}[x]=p[-1,-1+((x*\text{invAngle}+128)>>8)], \text{with } x=-nHc \ldots -1$$

A prediction image generated from the main reference pixel refMain[x] is stored in the intermediate image predSamples' [x,y].

$$\text{predSamples'}[x,y]=((32-i\text{Fact})*\text{refMain}[x+i\text{Idx}+1]+i\text{Fact}*\text{refMain}[x+i\text{Idx}+2]+16)>>5$$

where ranges of x and y are x=0 ... 2*nWc-1 and y=0 ... nHc-1, respectively.

Finally, the prediction image predSamples[x,y] is derived from the intermediate image predSamples'[x,y] in accordance with the following formula.

$$\text{predSamples}[x,y]=\text{predSamples'}[2*x,y], \text{with } x=0nWc-1, y=0 \ nHc-1$$

Since a pixel having x as an odd number in the intermediate image predSamples'[x,y] is not referenced in this formula, the calculation of half the number of pixels is omitted. Alternatively, if the pixels of an odd number are derived from the intermediate image predSamples'[x,y], the derived pixels may be used in the generation of a more accurate prediction image predSamples[x,y] by filtering the intermediate image predSamples'[x,y].

The generation of the intermediate image predSamples' [x,y] has been described for exemplary purposes only. The derivation result of the pixel value may be directly stored in predSamples[x,y] without generating the intermediate image predSamples'[x,y].

In a case that the luma prediction mode is reused in the image having the color format 4:2:2, the intermediate prediction image generated using the coordinate system similar to that of the luma is converted into a chroma coordinate system to generate the chroma prediction image. The prediction direction is thus corrected to that the prediction direction matches the prediction direction represented by the luma prediction mode. In this way, a difference in the prediction direction between the luma prediction image and the chroma prediction image is eliminated, and the accuracy of the chroma prediction image is improved.

Modification 2: Correction of Prediction Direction by Mapping of Prediction Mode During the use of the DM mode, namely in a case that the luma prediction mode is reused as the chroma prediction mode, the prediction direction deriver 1453 in the moving image decoding apparatus 1 may correct the prediction direction by mapping the luma prediction mode to another prediction mode without switching gradient definition tables. For example, the prediction direction deriver 1453 of FIG. 1 may be modified as illustrated in FIG. 26, and the chroma prediction unit 146 of FIG. 15 may be modified as illustrated in FIG. 27.

Figure 26:
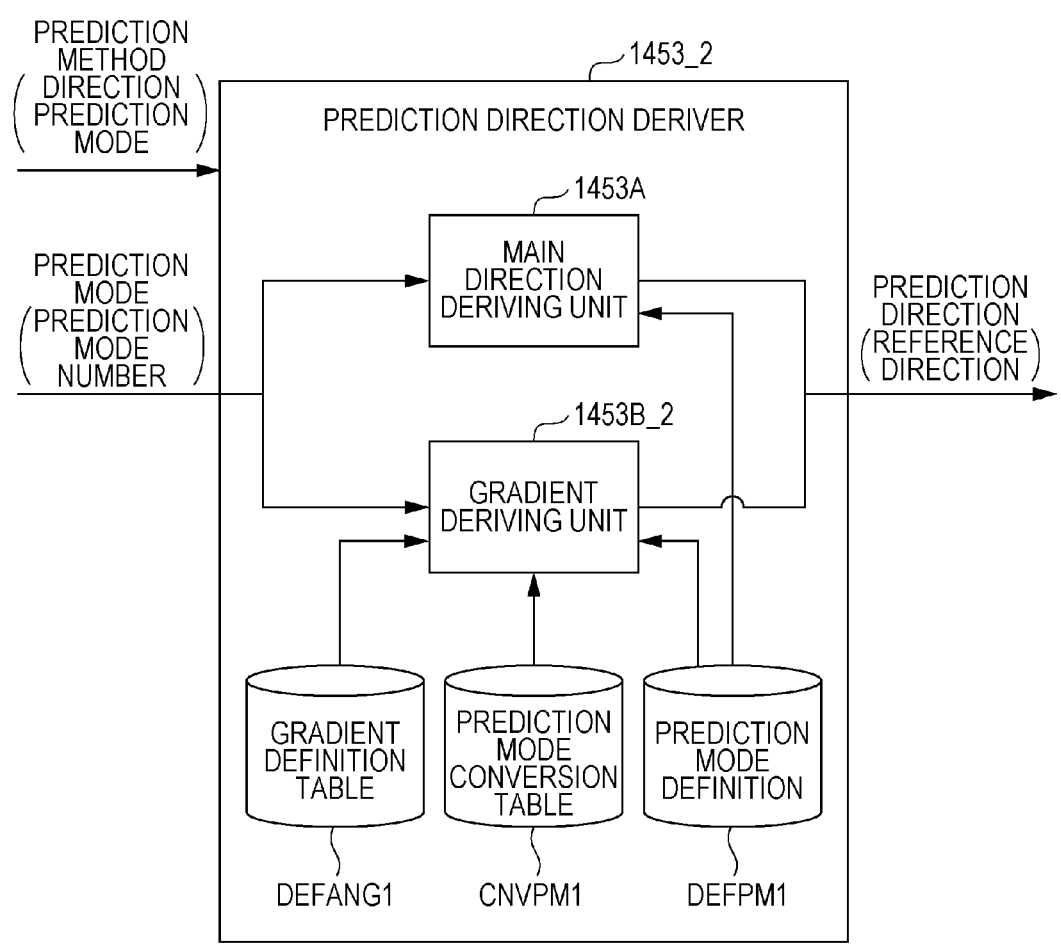
FIG. 26 is a functional block diagram illustrating a modification of the prediction direction deriver in the moving image decoding apparatus.

The gradient deriving unit 1453B_2 of FIG. 26 always uses the gradient definition table DEFANG1 of FIG. 13 without switching gradient definition tables while referencing a conversion table CNVPM1 of FIG. 28. The gradient deriving unit 1453B_2 converts the prediction direction (represented by NAME(Luma)) corresponding to the luma prediction mode (IntraPredMode) in the chroma domain in accordance with the prediction mode definition DEFPM1, using the conversion table CNVPM1 of FIG. 28, and thus obtains a prediction direction (represented by NAME (Chroma)) corresponding to the chroma prediction mode (IntraPredModeC). In a case of the 4:2:2 format, the conversion table CNVPM1 of FIG. 28 is an association table that associates the luma prediction mode with the chroma prediction so that the luma prediction mode and the chroma prediction mode are approximately at the same gradient in prediction direction. For example, a luma prediction mode VER+8 is converted to a chroma prediction mode VER+5. The value of deviation of VER+8 is +32 with respect to the horizontal direction, and the value of deviation of a chroma prediction mode corresponding to VER+8 is +16 that results from dividing+32 by 2. The prediction mode having a deviation with respect to the horizontal direction closest to +16 is VER+5 having a deviation of +17. The luma prediction mode VER+8 is thus associated with the chroma prediction mode VER+5. In another example, the value of deviation of a luma prediction mode VER+8 is +32 with respect to the vertical direction. A chroma prediction mode having a deviation of +32*2=64 with respect to the vertical direction does not exist as a prediction mode having the main direction thereof as a horizontal direction. For this reason, the prediction mode VER+8 is associated with a chroma prediction mode VER+5 having a vertical direction as the main direction and having a closer gradient. Gradients [+17,−32] of VER+5 are close to gradients [−32,+64] of HOR+8. In the conversion table CNVPM1 of FIG. 28, other prediction modes are respectively associated with prediction modes having close gradients.

Figure 27:
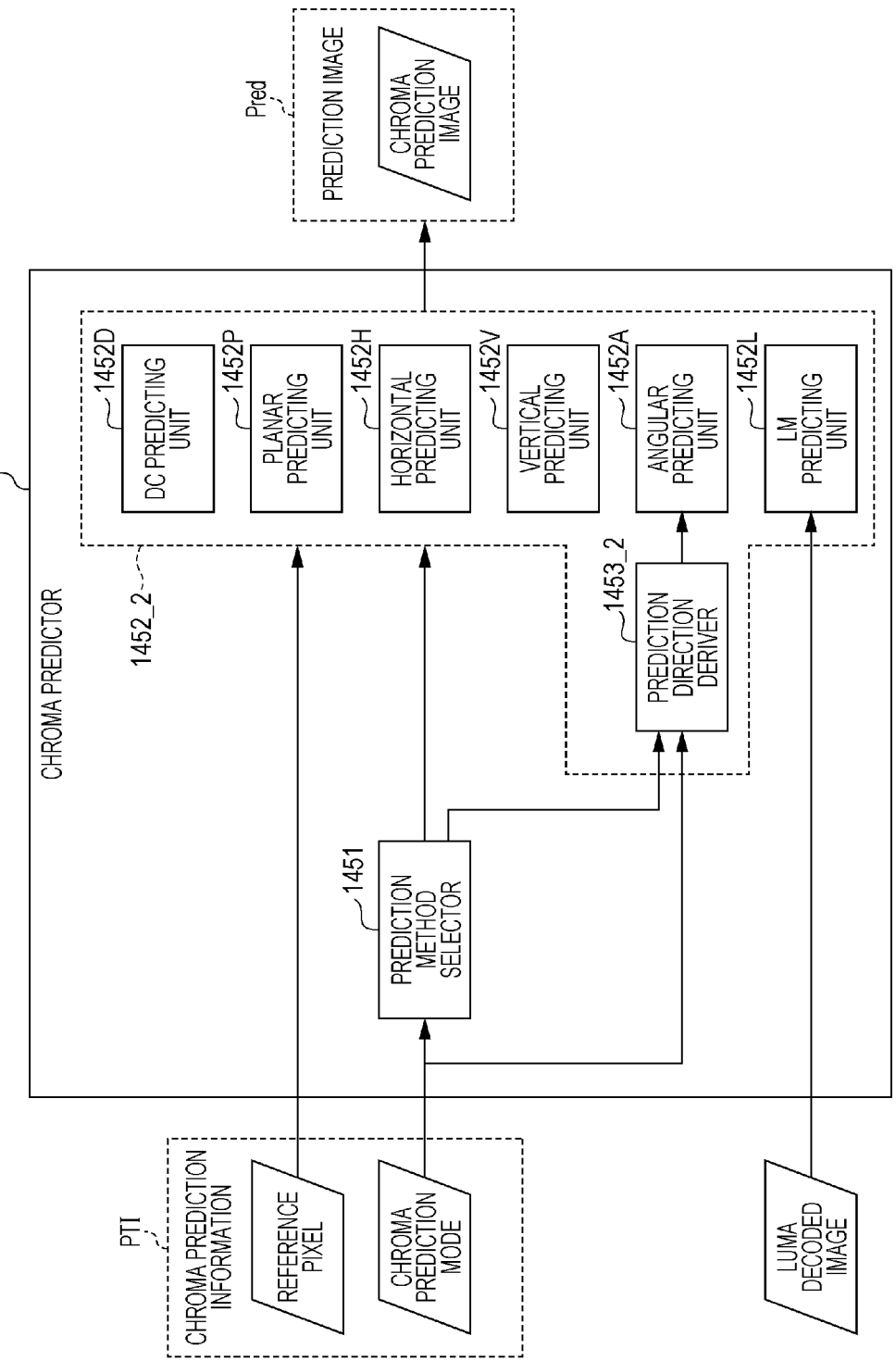
FIG. 27 is a block diagram illustrating another modification of the chroma prediction unit included in the prediction image generator.

The chrominance gradient prediction unit 146_2 of FIG. 27 includes a prediction direction deriver 1453_2 in place of the prediction direction deriver 1453 of FIG. 15.

In a case that the luma prediction mode is reused, the luma prediction mode is appropriately converted to a chroma prediction mode having the same direction in the chroma domain, resulting in a more accurate chroma prediction image.

Modification 3: Limitation on Chroma Prediction Mode

Figure 29:
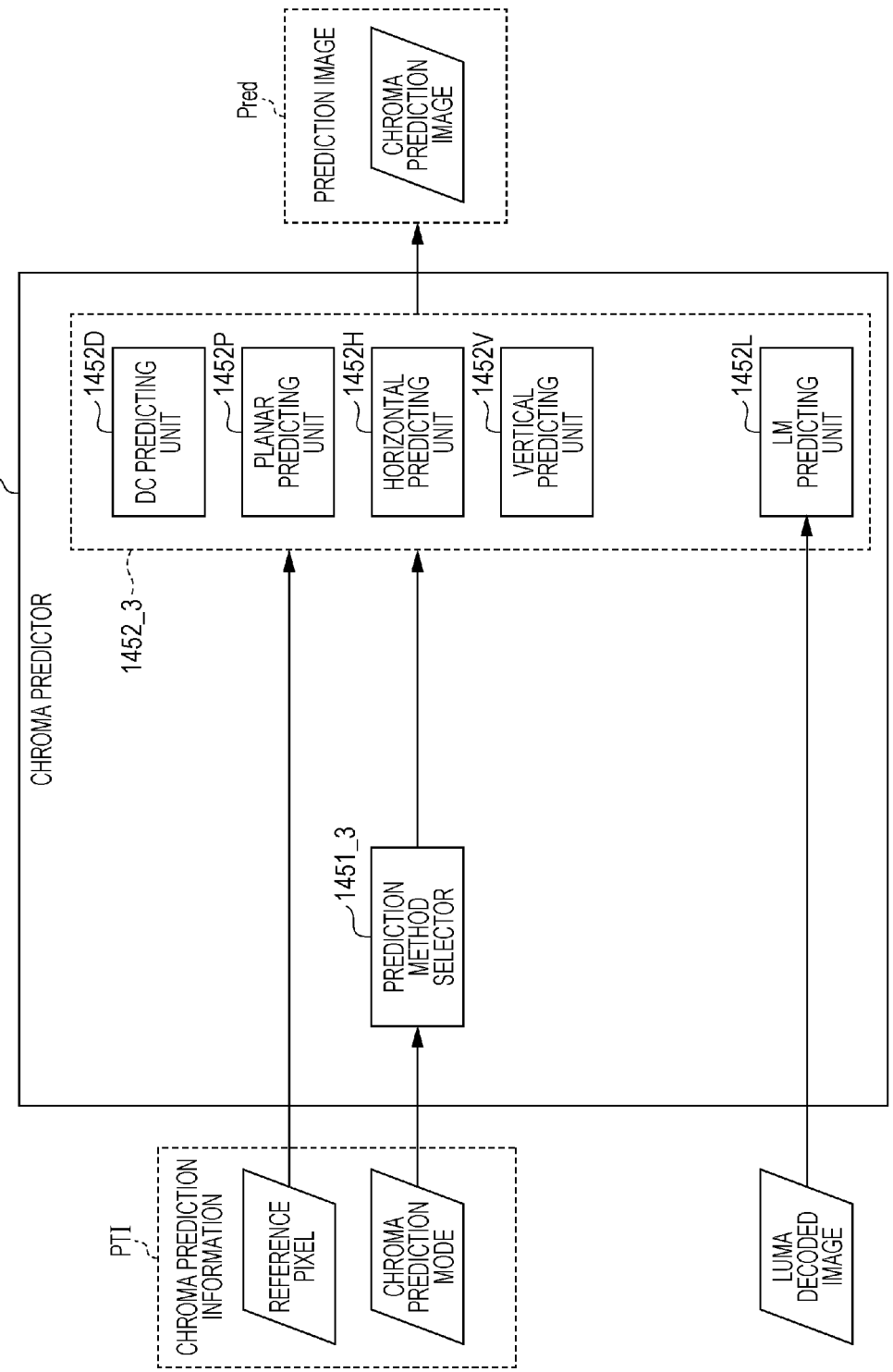
FIG. 29 is a block diagram illustrating another modification of the chroma prediction unit included in the prediction image generator.

In yet another modification, a method of limiting the chroma prediction mode is available. For example, the chroma prediction unit 146 of FIG. 15 may be modified as illustrated in FIG. 29. The chroma prediction unit 146_3 of FIG. 29 includes a prediction method selector 1451_3 in place of the prediction method selector 1451 of FIG. 15. The chroma prediction unit 146_3 of FIG. 29 includes neither prediction direction deriver nor angular predicting unit.

The prediction method selector 1451_3 of FIG. 29 selects a prediction method in the prediction image generation based on the input prediction mode and outputs the selection results. In the prediction selection, a prediction method corresponding to a prediction mode number of the input prediction mode is selected in accordance with the definition of FIG. 4 in the luma domain and in accordance with the definition of FIG. 30 in the chroma domain.

FIG. 30 illustrates an example of the prediction mode number associated with the type of intra prediction method for use in the chroma domain. Unlike the example of FIG. 4, prediction mode numbers '4' through '34' are not assigned to the angular prediction. In the chroma domain, the use of the definition of the prediction mode of FIG. 30 is free of the angular prediction, and avoids a degradation in the accuracy of the prediction image caused by an error in the prediction direction.

Application Examples

As described above, the moving image coding apparatus 2 and the moving image decoding apparatus 1 may be mounted in a variety of apparatuses to transmit, receive, record, and reproduce a moving image. The moving image may be a naturally moving image captured by a camera or the like, or a computer animation generated by a computer (including CG and GUI).

The transmission and reception of a moving image performed by each of the moving image coding apparatus 2 and the moving image decoding apparatus 1 are described with reference to FIG. 31.

FIG. 31(a) is a block diagram illustrating a transmission apparatus PROD_A having the moving image coding apparatus 2 mounted thereon. As illustrated in FIG. 31(a), the transmission apparatus PROD_A includes a coding unit PROD_A1 that obtains coded data by coding a moving image, a modulation unit PROD_A2 that obtains a modulation signal by modulating a carrier wave with the coded data from the coding unit PROD_A1, a transmission unit PROD_A3 that transmits the modulation signal from the modulation unit PROD_A2. The moving image coding apparatus 2 functions as the coding unit PROD_A1.

The transmission apparatus PROD_A further includes a camera PROD_A4 that captures a moving image and serves as a source of the moving image to be input to the coding unit PROD_A1, a recording medium PROD_A5 that has the moving image recorded thereon, an input terminal PROD_A6 that receives a moving image from the outside, and an image processor A7 that generates or processes an image. Although the transmission apparatus PROD_A includes all these elements as illustrated in FIG. 31(a), some of these elements may be omitted from the transmission apparatus PROD_A.

The recording medium PROD_A5 may record an uncoded moving image, or may record a moving image that is coded in a recording coding scheme different from a transmission coding scheme. If the moving image is coded in the recording coding scheme, a decoding unit (not illustrated) may be included between the recording medium PROD_A5 and the coding unit PROD_A1 to decode coded data read from the recording medium PROD_A5 in accordance with the recording coding scheme.

FIG. 31(b) illustrates a configuration of a reception apparatus PROD_B having the moving image decoding apparatus 1 mounted thereon. As illustrated in FIG. 31(b), the reception apparatus PROD_B includes a reception unit PROD_B1 that receives a modulation signal, a demodulation unit PROD_B2 that that obtains coded data by demodulating the modulation data received by the reception unit PROD_B1, and a decoding unit PROD_B3 that obtains a moving image by decoding the coded data from the demodulation unit PROD_B2. The moving image decoding apparatus 1 functions as the decoding unit PROD_B3.

The reception apparatus PROD_B may further include a display PROD_B4 that displays a moving image and serves as a transfer destination of the moving image output from thedecoding unit PROD_B3, a recording medium PROD_B5 that records the moving image, and an output terminal PROD_B6 that is used to output the moving image therefrom to the outside. Although the reception apparatus PROD_B includes all these elements as illustrated in FIG. 31(b), some of these may be omitted the reception apparatus PROD_B.

The recording medium PROD_B5 may record an uncoded moving image, or may record a moving image that is coded in a recording coding scheme different from a transmission coding scheme. If the moving image is coded in the recording coding scheme, a coding unit (not illustrated) may be included between the decoding unit PROD_B3 and the recording medium PROD_B5 to code the moving image from the decoding unit PROD_B3 in accordance with the recording coding scheme.

The transmission medium to transmit a modulation signal may be a wireless or wired medium. The transmission medium may be broadcasting (indicating the form of transmission with a transmission destination unspecified), or communication (indicating the form of transmission with a transmission destination specified). More specifically, the transmission of the modulation signal may be implemented using any type of transmission including wireless broadcasting, wired broadcasting, wireless communication, and wired communication.

A broadcasting station (such as a broadcasting facility) for terrestrial digital broadcasting/a receiving station (such as a television receiver) are examples of the transmission apparatus PROD_A and the reception apparatus PROD_B for transmitting and receiving a modulation signal in wireless broadcasting. A transmitting station for cable television broadcasting (such as a broadcasting facility)/a receiving station (such as a television receiver) are examples of the transmission apparatus PROD_A and the reception apparatus PROD_B for transmitting and receiving the modulation signal through wired broadcasting.

Furthermore, a server for VOD (Video On Demand) using the Internet or a server for moving image hosting service (such as a workstation)/clients (a television receiver, a personal computer, or smartphone) are examples of the transmission apparatus PROD_A and the reception apparatus PROD_B for transmitting and receiving the modulation signal via communications (generally, a wireless or wired medium is used as a transmission medium in LAN, and a wired medium is used as the transmission medium in WAN). The personal computers herein include a desk-top PC, a laptop PC, and a tablet PC. The smartphone includes a multi-function mobile phone.

The client of the moving image hosting service typically includes a function of decoding coded data downloaded from a server and displaying the data on a display and a function of coding a moving image captured by a camera, coding the moving image, and uploading the coded moving image to the server. More specifically, the client of the moving image hosting service functions as both the transmission apparatus PROD_A and the reception apparatus PROD_B.

The recording and reproduction of the moving image by the moving image coding apparatus 2 and the moving image decoding apparatus 1 are described with reference to FIG. 32 as below.

FIG. 32(a) is a block diagram illustrating a recording apparatus PROD_C having the moving image coding apparatus 2 mounted thereon. As illustrated in FIG. 32(a), the recording apparatus PROD_C includes a coding unit PROD_C1 that obtains coded data by coding a moving image, and a writer PROD_C2 that writes the coded data from the coding unit PROD_C1 onto a recording medium PROD_M. The moving image coding apparatus 2 functions as the coding unit PROD_C1.

The recording medium PROD_M may be (1) a type built in the recording apparatus PROD_C, such as HDD (Hard Disk Drive) or SSD (Solid State Drive), (2) a type to be connected to the recording apparatus PROD_C, such as an SD memory or a USB (Universal Serial Bus) flash memory, or (3) a memory to be loaded on a drive device (not illustrated) built in the recording apparatus PROD_C, such as a DVD (Digital Versatile Disc) or a BD (Blu-ray Disc (Registered Trademark)).

The recording apparatus PROD_C may further include a camera PROD_C3 that captures a moving and serves as a source of the moving image to be input to the coding unit PROD_C1, an input terminal PROD_C4 that receives a moving image from the outside, a reception unit PROD_C5 that receives a moving image, and an image processor C6 that generates or processes an image. Although the recording apparatus PROD_C includes all these elements as illustrated in FIG. 32(a), some of these may be omitted from the recording apparatus PROD_C.

The reception unit PROD_C5 may receive an uncoded moving image, or may receive a moving image that is coded in a transmission coding scheme different from a recording coding scheme. If the moving image is received in the transmission coding scheme, a transmission decoding unit (not illustrated) may be included between the reception unit PROD_C5 and the coding unit PROD_C1 to decode the moving image coded in the transmission coding scheme.

Examples of the recording apparatus PROD_C include a DVD recorder, a BD recorder, and an HD (Hard Disk) recorder (in this case, the input terminal PROD_C4 or the reception unit PROD_C5 serves as a main source of the moving image). Also, examples of the recording apparatus PROD_C include a camcorder (in this case, the camera PROD_C3 serves as a main source of the moving image), a personal computer (in this case, the reception unit PROD_C5 serves as a main source of the moving image), a smartphone (in this case, the camera PROD_C3, the reception unit PROD_C5 or the image processor PROD_C6 serves as a main source of the moving image).

FIG. 32(b) is a block diagram illustrating the configuration of a reproducing apparatus PROD_D having the moving image decoding apparatus 1 mounted thereon. Referring to FIG. 32(b), the reproducing apparatus PROD_D includes a reader PROD_D1 that reads coded data written on a recording medium PROD_M, and a decoding unit PROD_D2 that obtains a moving image by decoding the coded data read by the reader PROD_D1. The moving image decoding apparatus 1 functions as the decoding unit PROD_D2.

The recording medium PROD_M may be (1) a type built in the reproducing apparatus PROD_D, such as HDD or SSD, (2) a type to be connected to the reproducing apparatus PROD_D, such as an SD memory or a USB flash memory, or (3) a memory to be loaded on a drive device (not illustrated) built in the reproducing apparatus PROD_D, such as a DVD or a BD.

The reproducing apparatus PROD_D may further include a display PROD_D3 that displays a moving image and functions as a transfer destination of the moving image output by the decoding unit PROD_D2, an output terminal PROD_D4 via which the moving image is output to the outside, and a transmission unit PROD_D5 that transmits the moving image. Although the reproducing apparatus PROD_D includes all these elements as illustrated in FIG. 32(b), some of these may be omitted from the reproducing apparatus PROD_D.

The transmission unit PROD_D5 may transmit an uncoded moving image, or may transmit a moving image that is coded in a transmission coding scheme different from a recording coding scheme. If the moving image is transmitted in the transmission coding scheme, a coding unit (not illustrated) may be included between the decoding unit PROD_D2 and the transmission unit PROD_D5 to code the moving image in accordance with the transmission coding scheme.

Examples of the reproducing apparatus PROD_D include a DVD player, a BD player, and an HDD player (in this case, the output terminal PROD_D4 with a television receiver or the like connected thereto serves as a main transfer destination). Also, examples of the reproducing apparatus PROD_D include a television receiver (in this case, the display PROD_D3 serves as a main transfer destination of the moving image), digital signage (digital signage is also referred to as electronic billboard or electronic bulletin board, and the display PROD_D3 or the transmission unit PROD_D5 serves as a main transfer destination of the moving image), a desktop PC (in this case, the output terminal PROD_D4 or the transmission unit PROD_D5 serves as a main transfer destination of the moving image), a laptop or tablet PC (in this case, the display PROD_D3 or the transmission unit PROD_D5 serves as a main transfer destination of the moving image), and a smartphone (in this case, the display PROD_D3 or the transmission unit PROD_D5 serves as a main transfer destination of the moving image).

Hardware Implementation and Software Implementation

Each element in the moving image decoding apparatus 1 and the moving image coding apparatus 2 may be implemented using a logical circuit formed on an integrated circuit (IC chip) in a hardware fashion, or using a CPU in a software fashion.

If each block is implemented in a software fashion, each of the moving image decoding apparatus 1 and the moving image coding apparatus 2 includes a CPU that executes an instruction of a program that performs each function, a ROM (Read Only Memory) that stores the program, a RAM (Random Access Memory) that expands the program, and a storage device (recording medium), such as a memory, that stores the program and a variety of data. A recording medium that stores in a computer readable fashion a program code (an executable program, an intermediate code program, or a source program) of a control program of each of the apparatuses as software that implements the functions is supplied to each of the apparatuses. The computer (or a CPU or an MPU thereof) reads the program recorded on the recording medium and executes the program. The object of the present invention is thus achieved.

The recording media include a tape type of media, such as a magnetic tape or a cassette tape, a disk type of media including a magnetic disk, such as a floppy (Registered Trademark) disk/hard disk, and an optical disk, such as a CD-ROM (Compact Disc Read-Only Memory)/MO disc (Magneto-Optical Disc)/MD (Mini Disc)/DVD (Digital Versatile Disc)/CD-R (CD Recordable)/Blue-ray disc (Registered Trademark), a card type of medium, such as IC card (including a memory card)/optical card, a semiconductor memory type of medium, such as a mask ROM/EPROM (Erasable Programmable Read-Only Memory)/EEPROM (Electrically Erasable and Programmable Read-Only Memory)/flash ROM, or a logical circuit type medium, such as PLD (Programmable logic device) or FPGA (Field Programmable Gate Array).

Each of the apparatuses may be configured to connect to a communication network, and is supplied with the program code via the communication network. The communication network may simply transmit the program code and is not limited to any particular one. For example, usable as the communication network may be any of the Internet, intranet, extranet, LAN (Local Area Network), ISDN (Integrated Services Digital Network), VAN (Value-Added Network), CATV (Community Antenna television/Cable Television) communication network, Virtual Private Network, telephone network, mobile communication network, and satellite communication network. A transmission medium forming the communication network may be any medium as long as the medium transmits the program code, and is not limited to any particular configuration or any particular type. For example, usable as the transmission medium may be any of wired networks including IEEE (Institute of Electrical and Electronic Engineers) 1394, USB, power-line carrier, cable TV network, telephone line, ADSL (Asymmetrical Digital Subscriber Line) network, and may be any of wireless networks including infrared of IrDA (Infrared Data Association) or a remote control, Bluetooth (Registered Trademark), IEEE802.11 radio, HDR (High Data Rate), NFC (Near Field Communication), DLNA (Digital Living Network Alliance), cellular phone network, satellite communication network, and terrestrial digital network. The present invention may be implemented in the form of a computer data signal embedded in a carrier wave wherein the computer data signal is the program code that is electronically transmitted.

INDUSTRIAL APPLICABILITY

The present invention is applicable to an image decoding apparatus that decodes data that is coded image data, and an image coding apparatus that generates coded data by coding image data. The present invention is also appropriately applicable to the data structure of the coded data generated by the image coding apparatus and referenced by the image decoding apparatus.

REFERENCE SIGNS LIST

1 Moving image decoding apparatus (image decoding apparatus)
14 Prediction image generator
141 Prediction unit configuration unit
142 Reference pixel configuration unit
143 Switch
144 Reference pixel filter
145 Luma prediction unit
146 Chroma prediction unit
1451 Prediction method selector
1452 Prediction image deriver
1452D DC predicting unit
1452P Planar predicting unit
1452H Horizontal predicting unit
1452V Vertical predicting unit
1452A Angular predicting unit
1452L LM predicting unit
1453 Prediction direction deriver
1453A Main direction deriving unit
1453B Gradient deriving unit (chroma prediction section)
2 Moving image coding apparatus (image coding apparatus)
23 Prediction image generator (chroma prediction section)

The invention claimed is:

1. An image decoding apparatus for decoding an image by generating prediction images using by an intra prediction mode, the image decoding apparatus comprising:
a circuit; wherein
the circuit is configured to derive a chroma prediction mode based on a luma prediction mode; and
the circuit is configured to generate a chroma prediction image by the chroma prediction mode,
wherein the circuit is configured to derive, in a case that a chroma prediction mode index included in coded data is one:
(i) the chroma prediction mode as an angular prediction mode in a case that the luma prediction mode is a vertical mode, and
(ii) the chroma prediction mode as a vertical prediction mode in a case that the luma prediction mode is a planar prediction mode.

2. The image decoding apparatus according to claim 1, wherein the chroma prediction mode is derived in a case that a color format is a 4:2:2 format.

3. An image decoding method for decoding an image by generating prediction images using by an intra prediction mode, the image decoding method comprising the steps of:
(a) deriving a chroma prediction mode based on a luma prediction mode; and
(b) generating a chroma prediction image by the chroma prediction mode, in the step (a), in a case that a chroma prediction mode index included in coded data is one:
  (i) deriving the chroma prediction mode as an angular prediction mode in a case that the luma prediction mode is a vertical mode, and
  (ii) deriving the chroma prediction mode as a vertical prediction mode in a case that the luma prediction mode is a planar prediction mode.

4. The image decoding method according to claim 3, wherein the chroma prediction mode is derived in a case that a color format is a 4:2:2 format.

5. An image coding apparatus for coding an image by generating prediction images using by an intra prediction mode, the image coding apparatus comprising:
  a circuit; wherein
  the circuit is configured to derive a chroma prediction mode based on a luma prediction mode; and
  the circuit is configured to generate a chroma prediction image by the chroma prediction mode,
  wherein the circuit is configured to derive, in a case that a chroma prediction mode index is one:
    (i) the chroma prediction mode as an angular prediction mode in a case that the luma prediction mode is a vertical mode, and
    (ii) the chroma prediction mode as a vertical prediction mode in a case that the luma prediction mode is a planar prediction mode.

6. The image coding apparatus according to claim 5, wherein the chroma prediction mode is derived in a case that a color format is a 4:2:2 format.

7. An image coding method for coding an image by generating prediction images using by an intra prediction mode, the image coding method comprising the steps of:
  (a) deriving a chroma prediction mode based on a luma prediction mode; and
  (b) generating a chroma prediction image by the chroma prediction mode, in the step (a), in a case that a chroma prediction mode index is one:
    (i) deriving the chroma prediction mode as an angular prediction mode in a case that the luma prediction mode is a vertical mode, and
    (ii) deriving the chroma prediction mode as a vertical prediction mode in a case that the luma prediction mode is a planar prediction mode.

8. The image coding method according to claim 7, wherein the chroma prediction mode is derived in a case that a color format is a 4:2:2 format.

* * * * *